US012361702B2

(12) United States Patent
Ayanoğlu et al.

(10) Patent No.: US 12,361,702 B2
(45) Date of Patent: Jul. 15, 2025

(54) AUTOMATIC COMPOSITION OF A PRESENTATION VIDEO OF SHARED CONTENT AND A RENDERING OF A SELECTED PRESENTER

(71) Applicant: MICROSOFT TECHNOLOGY LICENSING, LLC, Redmond, WA (US)

(72) Inventors: Defne Ayanoğlu, Prague (CZ); Nakul Madaan, Prague (CZ)

(73) Assignee: Microsoft Technology Licensing, LLC, Redmond, WA (US)

( * ) Notice: Subject to any disclaimer, the term of this patent is extended or adjusted under 35 U.S.C. 154(b) by 460 days.

(21) Appl. No.: 17/565,442

(22) Filed: Dec. 29, 2021

(65) Prior Publication Data

US 2023/0206621 A1   Jun. 29, 2023

(51) Int. Cl.
*G06V 10/94* (2022.01)
*G06V 40/16* (2022.01)
*G06V 40/20* (2022.01)
*G10L 17/00* (2013.01)
*H04L 12/18* (2006.01)
*H04N 7/15* (2006.01)

(52) U.S. Cl.
CPC ............ *G06V 10/94* (2022.01); *G06V 40/168* (2022.01); *G06V 40/20* (2022.01); *G10L 17/00* (2013.01); *H04L 12/1813* (2013.01); *H04N 7/15* (2013.01)

(58) Field of Classification Search
None
See application file for complete search history.

(56) References Cited

U.S. PATENT DOCUMENTS 9,836,870 B2   12/2017  Smith et al.
10,515,561 B1 *  12/2019  Fieldman ................. G09B 7/00
(Continued)

FOREIGN PATENT DOCUMENTS

CN        104079541 B     5/2018
WO    WO-2016140775 A1 *  9/2016  ............... G06K 9/00

OTHER PUBLICATIONS

Decamp, David, "Best Practices: Hybrid Meetings with Zoom", Retrieved from: https://digital.bu.edu/zoom-hybrid-meetings/, Jul. 2, 2021, 30 Pages.

(Continued)

*Primary Examiner* — Akwasi M Sarpong
*Assistant Examiner* — Pawan Dhingra
(74) *Attorney, Agent, or Firm* — Scott Y. Shigeta; Newport IP, LLC

(57) ABSTRACT

The disclosed system provides automatic composition of a presentation video of shared content with a rendering of a selected presenter. When a speaker is giving a presentation and providing shared content projected on a screen to in-room attendees, a system provides the composite presentation video with on-line attendees. The system can select one in-room attendee as the presenter based on one or more factors. For instance, the system may select a person that is positioned closer to an object, such as a podium. A person may also be selected based on other types of interaction with an object, e.g., whether a person is touching a podium. Automatic selection of a user and automatic generation of the composite presentation video allows a system to share the in-room dynamics with remote participants of a hybrid meeting.

20 Claims, 14 Drawing Sheets

(56) References Cited

U.S. PATENT DOCUMENTS

| | | | |
|---|---|---|---|
| 10,771,272 B1* | 9/2020 | Ghanaie-Sichanie | ........................ H04W 28/24 |
| 10,832,223 B2 | 11/2020 | Kumar et al. | |
| 2006/0168529 A1 | 7/2006 | Rokosz et al. | |
| 2011/0040591 A1 | 2/2011 | Durocher et al. | |
| 2011/0057878 A1* | 3/2011 | Moore | .................. G06F 3/0304 345/157 |
| 2013/0335508 A1* | 12/2013 | Mauchly | .................. H04N 7/15 348/14.08 |
| 2015/0029294 A1* | 1/2015 | Lin | ........................ H04N 7/141 348/14.01 |
| 2015/0256795 A1 | 9/2015 | Chauhan | |
| 2015/0301694 A1 | 10/2015 | Gottlieb | |
| 2016/0260236 A1* | 9/2016 | Fogarty | .................. H04N 7/147 |
| 2017/0039867 A1* | 2/2017 | Fieldman | .................. G09B 7/00 |
| 2017/0244931 A1* | 8/2017 | Faulkner | ............. H04L 65/1063 |
| 2017/0346880 A1* | 11/2017 | Gay | .................... H04L 65/1069 |
| 2018/0232566 A1* | 8/2018 | Griffin | .................. G06V 40/166 |
| 2020/0344278 A1* | 10/2020 | Mackell | .................. G06V 20/52 |
| 2021/0076105 A1* | 3/2021 | Parmar | .......... H04N 21/234336 |

OTHER PUBLICATIONS

"International Search Report and Written Opinion Issued in PCT Application No. PCT/US22/044785", Mailed Date: Jan. 20, 2023, 22 Pages.

\* cited by examiner

FIG. 5
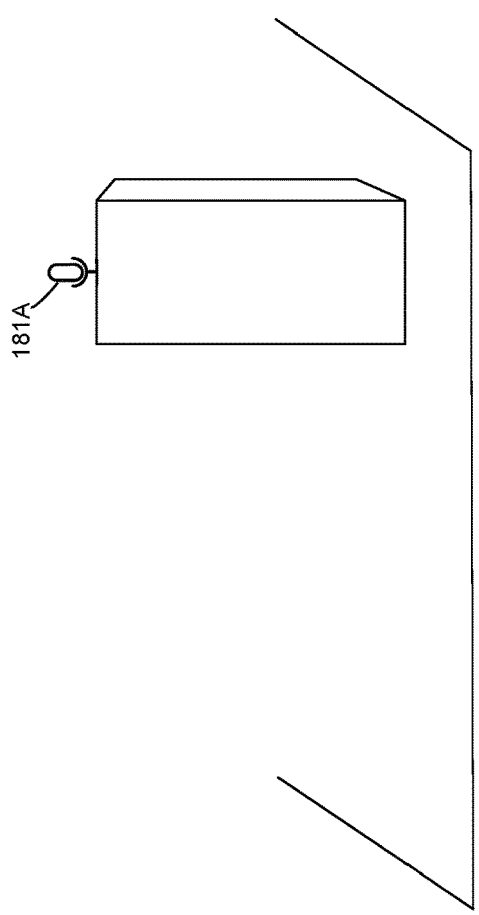
Selection of a presenter using configuration data defining microphone attributes
| CAMERA ID | POSITION | PRESENTER |
|---|---|---|
| MIC 1 | PODIUM | YES |
| MIC 2 | AUDIENCE | NO |
CONFIGURATION DATA 714
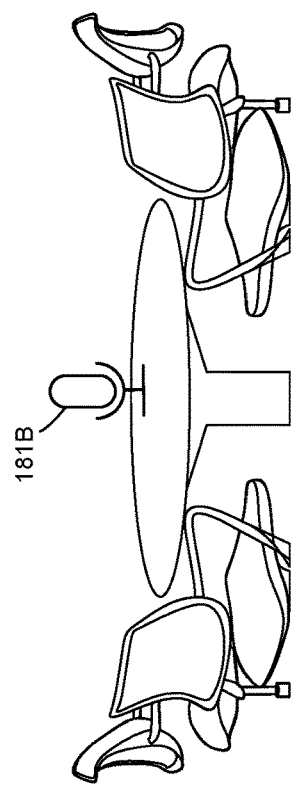

Selection of a presenter based on a position relative to a real-world object, e.g., a podium.

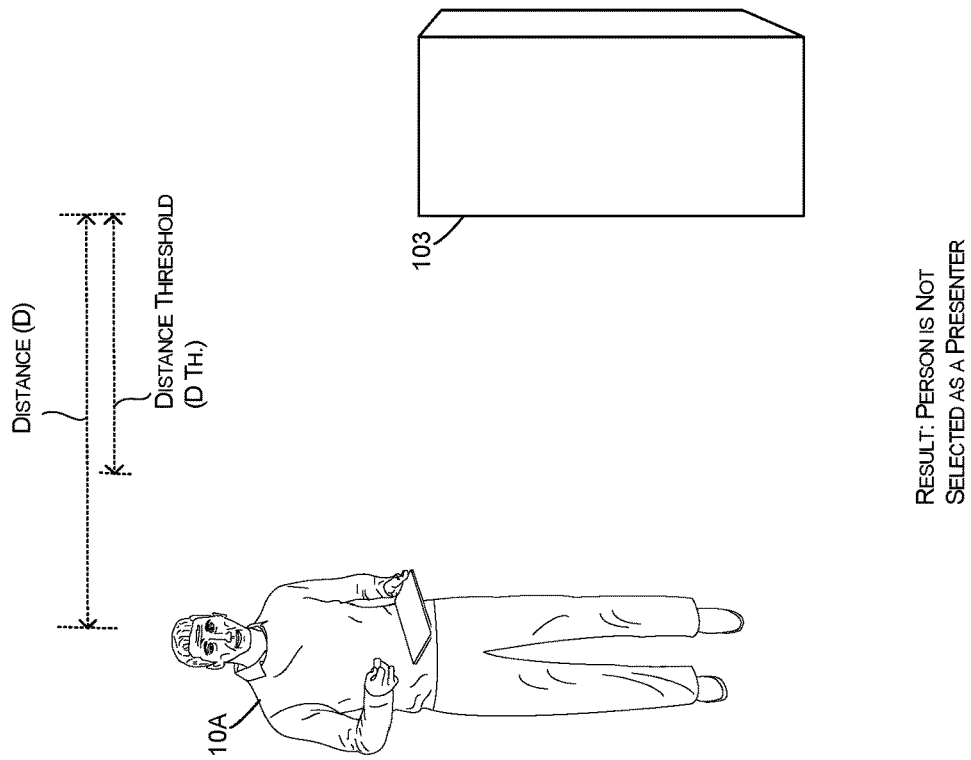

Selection of a presenter based on a distance from a real-world object, e.g., a podium.

AUTOMATIC COMPOSITION OF A PRESENTATION VIDEO OF SHARED CONTENT AND A RENDERING OF A SELECTED PRESENTER

BACKGROUND

A hybrid meeting involves attendees at a physical location and remote attendees. This can involve a meeting with participants attending from a conference room, and at the same time, the meeting is streamed to online attendees. There are a number of different types of systems that allow users to participate in hybrid meetings. For example, some systems include conference room equipment, such as a camera that is directed to a stage. As presenters enter the stage, a video stream generated by the camera can be shared with a number of participants. The presenter can share content with the participants using video streams, files, chat messages, emails, etc. Some systems provide user interface features and permission settings that allow some users to share content with an audience.

Although some systems can provide specific sets of permissions for users to take on certain roles in a meeting, such systems have a number of drawbacks. For instance, when an audience member wishes to become a presenter, that person may have to submit a request to become a meeting presenter. In such systems, the flow of a meeting may not be optimized as a person may have to take time away from a presentation to change permissions, camera settings, etc. This can cause lag or downtime in discussions which is not optimal for the participants nor is it optimal in the use of the computing resources. This may lead to a number of inefficiencies in the use of a computing system in that meetings may be prolonged or additional meetings may be needed to communicate essential information. Also, requiring users to provide manual input to control permission settings can lead to security issues, as inadvertent inputs and other forms of human error can be a factor.

The above-described shortcomings can also be exacerbated when a hybrid model is involved. In some situations, when several presenters are positioned on a stage, it may not be clear to an online attendee which speaker to focus on as online users may not be able to view the in-room dynamics. Given such issues, there is an ongoing need to improve the features of online collaborative tools to bring the in-room dynamics to the remote participants. In addition, the requirement of having each user provide manual inputs to change permissions for each presenter can lead to security issues as inadvertent inputs and other errors can lead to data integrity issues, incorrect permissions for users and files, etc.

SUMMARY

The techniques disclosed herein provide automatic composition of a presentation video of shared content and a rendering of a selected presenter. For example, when a speaker is giving a presentation and providing shared content projected on a screen to in-room attendees, a system generates a composite presentation stream showing a shaped "cutout" rendering of the speaker with a rendering of shared content. The composite presentation stream is then shared with on-line attendees. Although there may be several people in the room, the system can select one of the people as the presenter based on one or more factors. For instance, the system may select a person that is positioned closer to an object, such as a podium. The person may be selected based on a number of factors involving that person's interaction with the in-room, real-world object. The system may then generate a presentation video displaying a cutout rendering of the selected person and content that is shared by that selected person. By automatically selecting an in-room person as a presenter and generating a composite video stream with that person and shared content, the system can avoid the need for manual user entries for changing a user interface arrangement, user permissions, and participant roles. These features can also allow a system to share in-room dynamics with remote participants of a hybrid meeting.

In one illustrative example, a system can obtain a video stream for presentation content. The presentation content can be in any form including a presentation slide deck, word document, spreadsheet, images, videos, etc. The system can also obtain a video stream of the in-room speaker/presenter on a stage or near a table. The system can select an in-room participant based on one or more factors. The system can then compose a presentation video stream by layering a "cutout" of the selected participant from the presenter video stream onto a rendering of any shared content. The system can then stream the presentation video stream to online attendees. In some configurations, when system detects additional speakers who join a meeting or attempt to speak or ask questions, the system can dynamically add a cutout of those additional speakers onto the content. These additional speakers can be online participants, or they can be in-room participants. The techniques disclosed herein also provide systems and methods for detecting which in-room presenter is speaking. These embodiments can include techniques for identifying specific video streams that are aimed at a podium, stage, or any other predetermined region. A person detected in any of these specific video streams can be selected as a presenter. A specific presenter may also be selected from a number of presenters based on directional detection of audio signal from the room. In addition, a specific presenter may also be selected from a number of presenters based on metadata of in-room speakers' information by facial recognition and pulling data from a directory database. The speakers can also be selected based on an association between a person and an in-room object, such as a podium, table, a display screen, etc.

The techniques disclosed herein can provide a number of technical benefits. For instance, by providing a video stream that automatically displays a selected presenter with shared content, the in-room dynamics can be communicated and shown to remote participants of a hybrid meeting. This helps the overall effectiveness of the meeting by raising the level of engagement of the remote participants to a level of that of in-room participants.

The system can also provide enhanced security features which can dynamically change permissions of a communication session by using a process for selecting a user that is determined to be a presenter for a meeting. In some existing systems that require manual entries to change permissions, users may forget to revoke permissions that are granted to presenters. This can cause security issues as presenters may have an increased level of control over sharing information and accessing information. The techniques disclosed herein can automatically grant permissions when a condition is detected and automatically revoke permissions when the condition is no longer detected. Such features can greatly enhance the security device as well as improve overall interaction efficiencies for a computing device. These efficiencies, and others, are provided by the techniques disclosed herein.

By automating a selection process of a person, the system can also avoid inadvertent inputs which are caused by systems that require manual entry. Such benefits can increase the efficiency of a computing system by reducing the number of times a user needs to interact with a computing device to obtain information, e.g., prolonging meetings, retrieving meeting recordings, requesting duplicate copies of previously shared content, etc. Thus, various computing resources such as network resources, memory resources, and processing resources can be reduced.

The efficiencies of the analysis of a select message can also lead to other efficiencies. In particular, by displaying messages more accurately within topics, a system can reduce the number of times a user needs to interact with a computing device to obtain information. This can lead to the reduction of manual data entry that needs to be performed by a user. By reducing the need for manual entry, inadvertent inputs and human error can be reduced. This can ultimately lead to more efficient use of computing resources such as memory usage, network usage, processing resources, etc.

Features and technical benefits other than those explicitly described above will be apparent from a reading of the following Detailed Description and a review of the associated drawings. This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter. The term "techniques," for instance, may refer to system(s), method(s), computer-readable instructions, module(s), algorithms, hardware logic, and/or operation(s) as permitted by the context described above and throughout the document.

BRIEF DESCRIPTION OF THE DRAWINGS

The Detailed Description is described with reference to the accompanying figures. In the figures, the left-most digit(s) of a reference number identifies the figure in which the reference number first appears. The same reference numbers in different figures indicate similar or identical items. References made to individual items of a plurality of items can use a reference number with a letter of a sequence of letters to refer to each individual item. Generic references to the items may use the specific reference number without the sequence of letters.

FIG. 5 illustrates an example scenario where microphones can be utilized to select a person as a presenter.

FIG. 8A illustrates an example scenario where a distance between a person and a real-world object prevents a system from selecting that person as a presenter.

DETAILED DESCRIPTION

Figure 1:
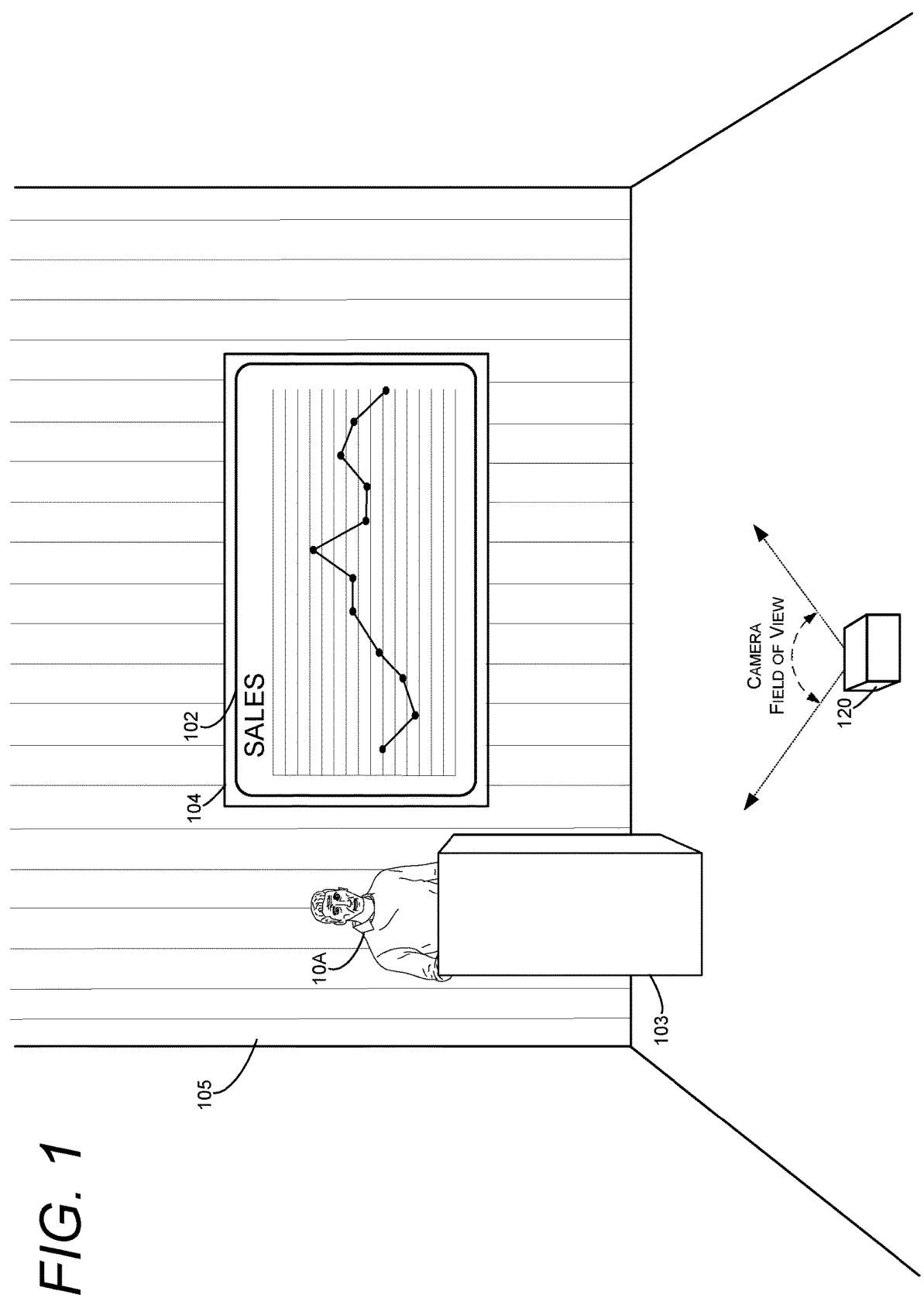
FIG. 1 illustrates an example scenario where a person is in a hybrid meeting and sharing content that is communicated to in-room participants and remote participants associated with remote computing devices.
Figure 2:
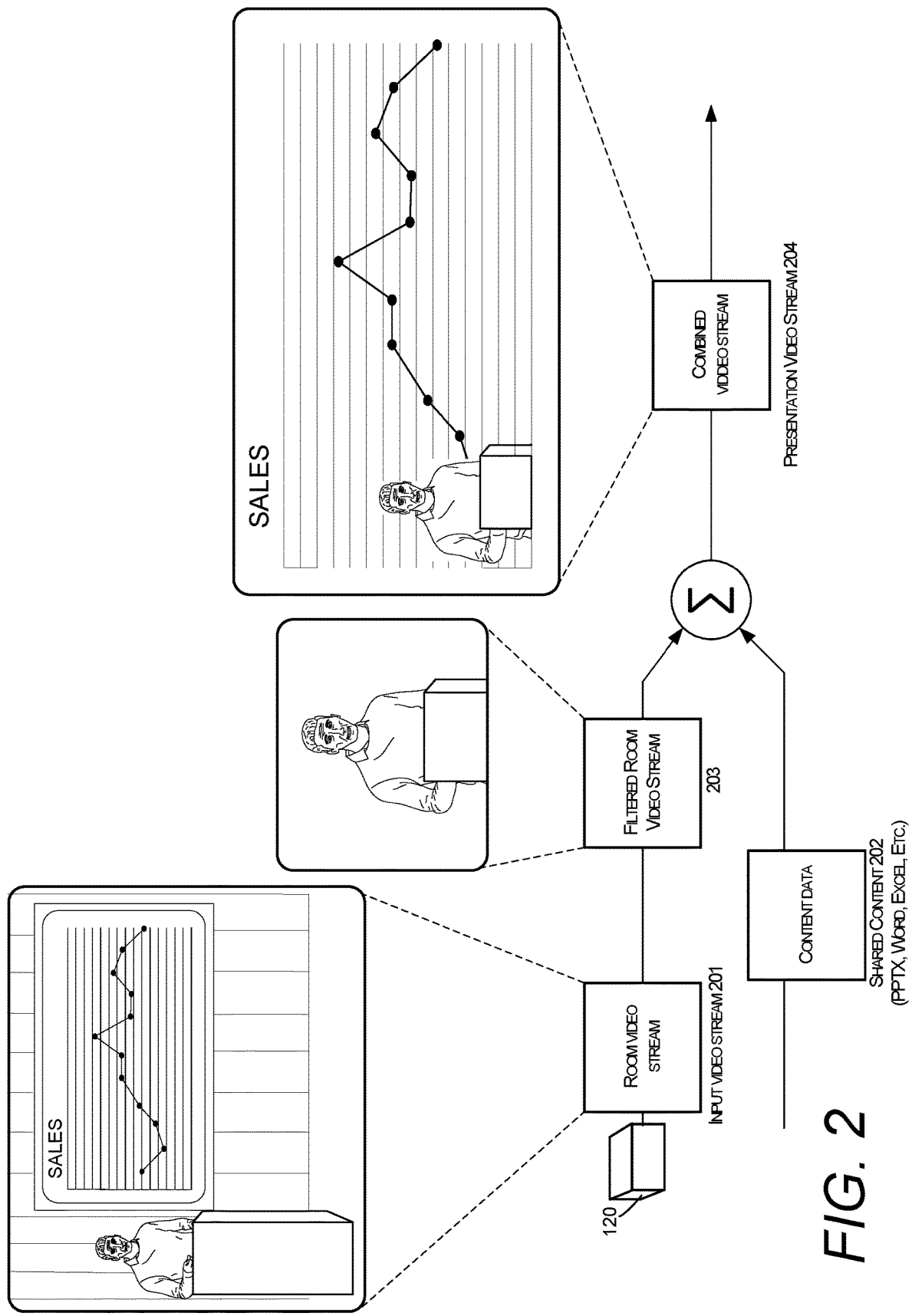
FIG. 2 illustrates aspects of the process for generating a combined video stream from a room video and content data.
Figure 3:
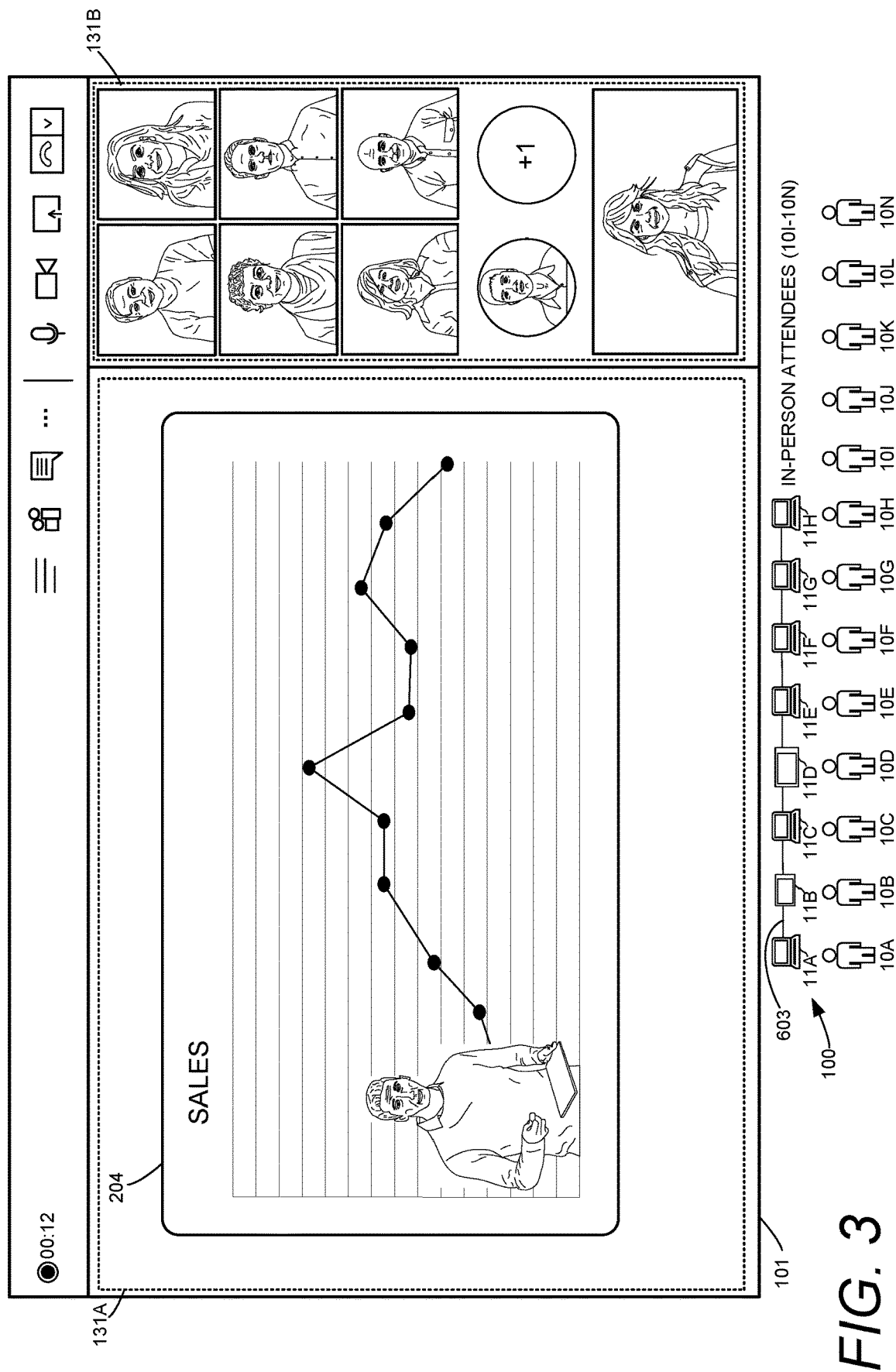
FIG. 3 illustrates aspects of the system and a corresponding user interface that can be utilized to implement the techniques disclosed herein.

FIG. 1 through FIG. 3 illustrates an example scenario involving a system that can provide automatic composition of a presentation video of shared content and a rendering of a selected presenter. In this example, the system selects a particular person as a presenter of hybrid meeting. As described below, the person is selected as the presenter based on one or more factors. The system then layers a cutout image of the presenter from a presenter video stream onto content that is shared by the person. The presenter video stream is then shared with a number of on-line attendees.

FIG. 1 illustrates an example scenario where a person 10A is giving a presentation that is captured by a camera 120. In this example, the person 10A is controlling the display of content 102 that is displayed on a screen 104 within a room having a background 105. The person 10A and the screen 104 is positioned within a field of view of a camera 120. In this scenario, a physical background 105 is positioned behind the person 10A relative to the camera 120. The person is also standing behind a real-world object 103, which in this example is a podium.

As shown in FIG. 2, the camera 120 can generate an input video stream 201. The input video stream can depict the person who is giving a presentation on related content. The content can be captured concurrently with the presenter when a display of the content and the presenter are in the field of view of the camera. The system can then generate a filtered rendering of the person 10A The filtered rendering of the person 10A can include a "cutout" image of the person, which involves a process for eliminating an image of a background 105 of a real-world environment. The rendering of the person can be included in a filtered room video stream 203. The system can then generate a presentation video stream 204 that combines the filtered room video stream 203 and the content data 202. Alternatively, if the background is to be included, the system can generate a presentation video stream 204 that combines the room video stream 201 and the content data 202.

The "cutout" image of the presenter, which is also referred to herein as a "filtered rendering," can be generated by the use of a number techniques. In one example, the system can receive the input video stream from a camera 120 that is directed toward a person. Thus, the input video stream can comprise an image of the person 10A and an image of a physical background 105 that is positioned behind the person 10A relative to the camera 120. The system can then apply a processing filter to the input video stream to remove, hide or obscure the image of the physical background 105 from the input video stream. The processing filter can then generate a filtered video stream 203 of the person comprising a rendering of the person without the image of the physical background 105. The filtered video stream 203 of the person can be shaped according to an outline of the person. The system can also scale the filtered video stream 203 of the person to a size for compatibility with the rendering of shared content. The system can then insert the filtered video stream 203 of the person that is shaped according to the outline of the person in the presentation video. In some configurations, the presentation video stream 204 can include a rendering of the presenter that is positioned and sized as an overlay over a rendering of the shared content. The presentation video stream 204 can also include a real-world object, such a podium, table or other item associated with the user. In some configurations, as described below, the real-world object can be used to identify the person as a presenter.

The system can also receive content data 202. The content data 202 can be in the form of a file, the contents of which can then be rendered and added for the presentation video stream 204. The content data, which is also referred to herein as shared content, can include content from a presentation file, a video file, word processing file, a spreadsheet file, an image, etc. The content data can be in the form of a content video stream, which can be generated by a computer controlled by the presenter.

As shown in FIG. 3, the system can cause a display of the presentation video 204 on a plurality of computing devices 11B-11N associated with a plurality of participants 10B-10N of a communication session 603. As shown, the presentation video 204 can include the rendering of shared content 102 and the filtered rendering of the person 10A that is selected as the presenter in response to detecting one or more predetermined physical characteristics of the person 10A. In some configurations, the presentation video 204 can be displayed within a user interface 101 that includes a content section 131A and a participant section 131B.

Aspects of the system 100 for implementing the techniques disclosed herein is also shown in FIG. 3. As shown, an event, such as a meeting, can include audience members. In this example, a meeting can include online audience (Users 10B-10H) and an in-person audience (Users 10I-10N). The in-person audience members can be in a room with the presenter, which in this example is the first user 10A. The online audience members (Users 10B-10H) can be at remote locations each operating a corresponding computing device (devices 11B-11H). Thus, the user interface 101

Now turning to FIGS. 4 through 8B, various embodiments of the techniques disclosed herein can select a person as a meeting presenter based on one or more factors. In some configurations, a person can be selected as a presenter based on one or more physical characteristics. As described below, a person can be selected from a number of people within a room based on a person's association with a real-world object, such as a table or podium. For example, a person can be selected as a presenter if the person is near a podium or behind a podium. In other embodiments, a person may be selected based on facial recognition techniques, the detection of video data being generated by a predetermined camera, the detection of a presenter's voice from a particular direction.

Figure 4:
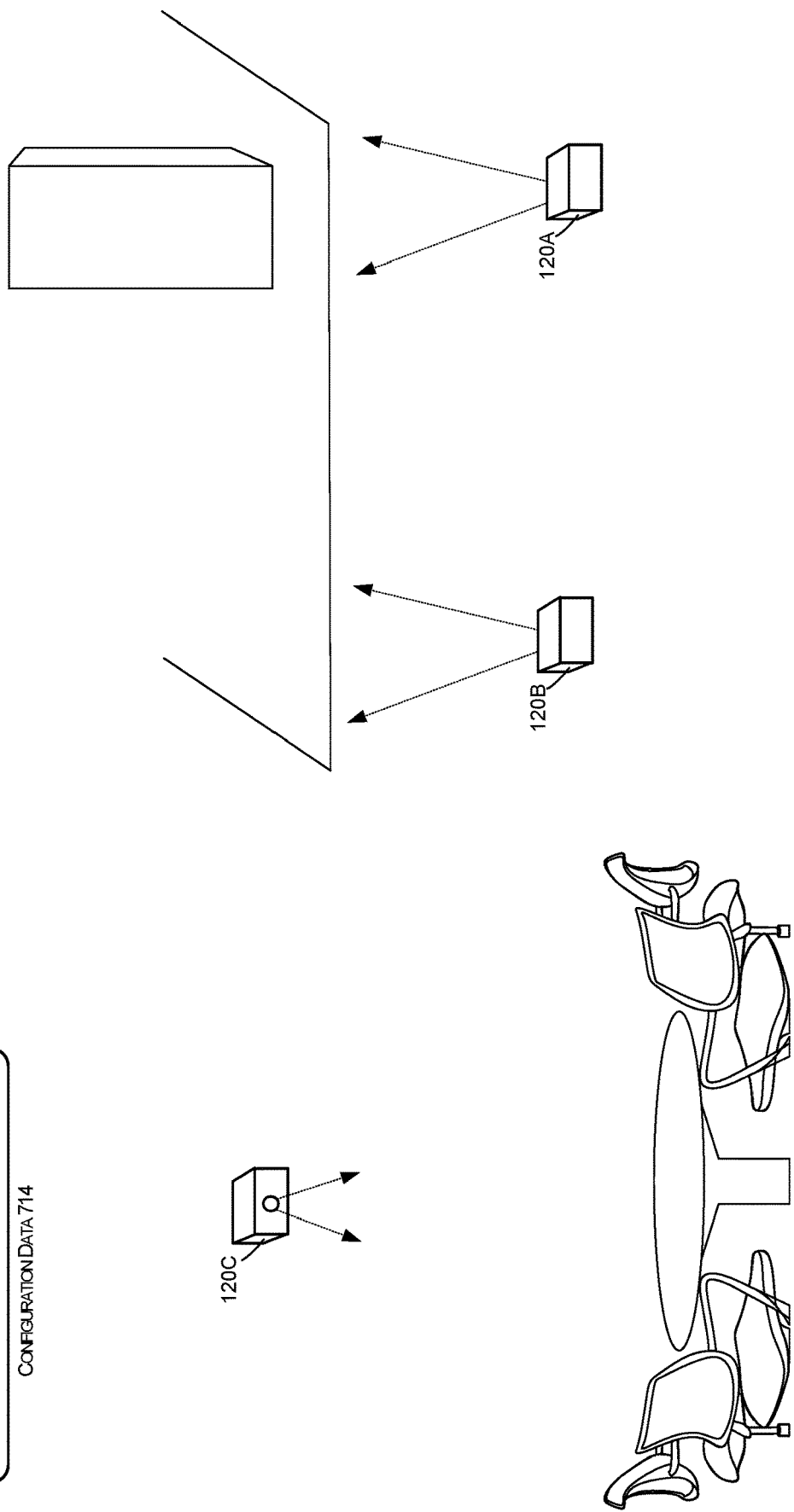
FIG. 4 illustrates an example scenario where cameras can be utilized to select a person as a presenter.

FIG. 4 shows one example of a how the system can determine which in-room participant is a presenter by the use of configuration data defining one or more attributes of a camera. In this example, a system may use configuration data 714 that defines: a first camera 120A directed towards a podium, a second camera 120B directed to another portion of a stage, and a third camera 120C directed towards an in-room audience. The configuration data also indicates that video signals capturing an individual in the field of view of the first camera can cause a system to select that individual as a presenter of an event. Thus, when a person walks in front of the field of view of the first camera, the first camera will generate a video signal indicating the presence of an individual and in response, the system can select that user as a presenter.

Thus, in one illustrative example, the system can analyze an input video stream 201 of the first camera to select the person 10A depicted in the input video stream 201 as a presenter. The selection of the person 10A is in response to detecting one or more predetermined physical characteristics of the person 10A, and wherein the one or more predetermined physical characteristics of the person 10A is detected by the system in response to determining that the camera has captured that person 10A within a viewing area of the camera. In some configurations, to mitigate false positive readings, the one or more predetermined physical characteristics of the person 10A is detected by the system in response to determining that the camera has captured a threshold number of images of the person within a viewing area of the camera. Thus, if less than the threshold number of images of the person is captured, the system may not detect one or more predetermined physical characteristics of the person 10A and thus may not select that person as a presenter.

FIG. 5 shows one example of a how the system can determine which in-room participant is presenting by the use of one or more microphones. In this example, configuration data defining one or more attributes of one or more microphones may be used. In this example, a system may use configuration data 714 that defines a first microphone 181A directed towards, or positioned near, a podium and a second microphone 181B directed to, or positioned near, an in-room audience. The configuration data also indicates that audio signals capturing the voice of an individual in proximity to the first microphone 181A can cause a system to select that individual as a presenter of an event. Thus, when a person speaks into the first microphone 181A, the first microphone 181A can generate an audio signal indicating the presence of an individual and in response, the system can select that user as a presenter.

In one illustrative example, the system can analyze an input stream 201, which can include an audio signal of the first microphone. In response to receiving audio data from the first microphone indicating a position of the person, e.g., that the person is at, or near, a selected microphone, the system may select that person as a presenter. Thus, in some embodiments, one or more predetermined physical characteristics of the person 10A can be detected by the system in response to determining that the audio data of one or more selected microphones indicates that the person is at a predetermined position. When a person is determined to be at a predetermined position, that person can be selected as a presenter.

In the example of FIG. 5, the configuration data can cause a system to select one or more participants near the first microphone as presenters based on audio signals received at the first microphone. The configuration data can also cause the system to determine that participants at the table near the second microphone would not be deemed as presenters given their proximity to the second microphone. Once a person is selected as a presenter based on audio signals, cameras directed to predetermined positions relative to a selected microphone can capture video data depicting that selected person.

Figure 6:
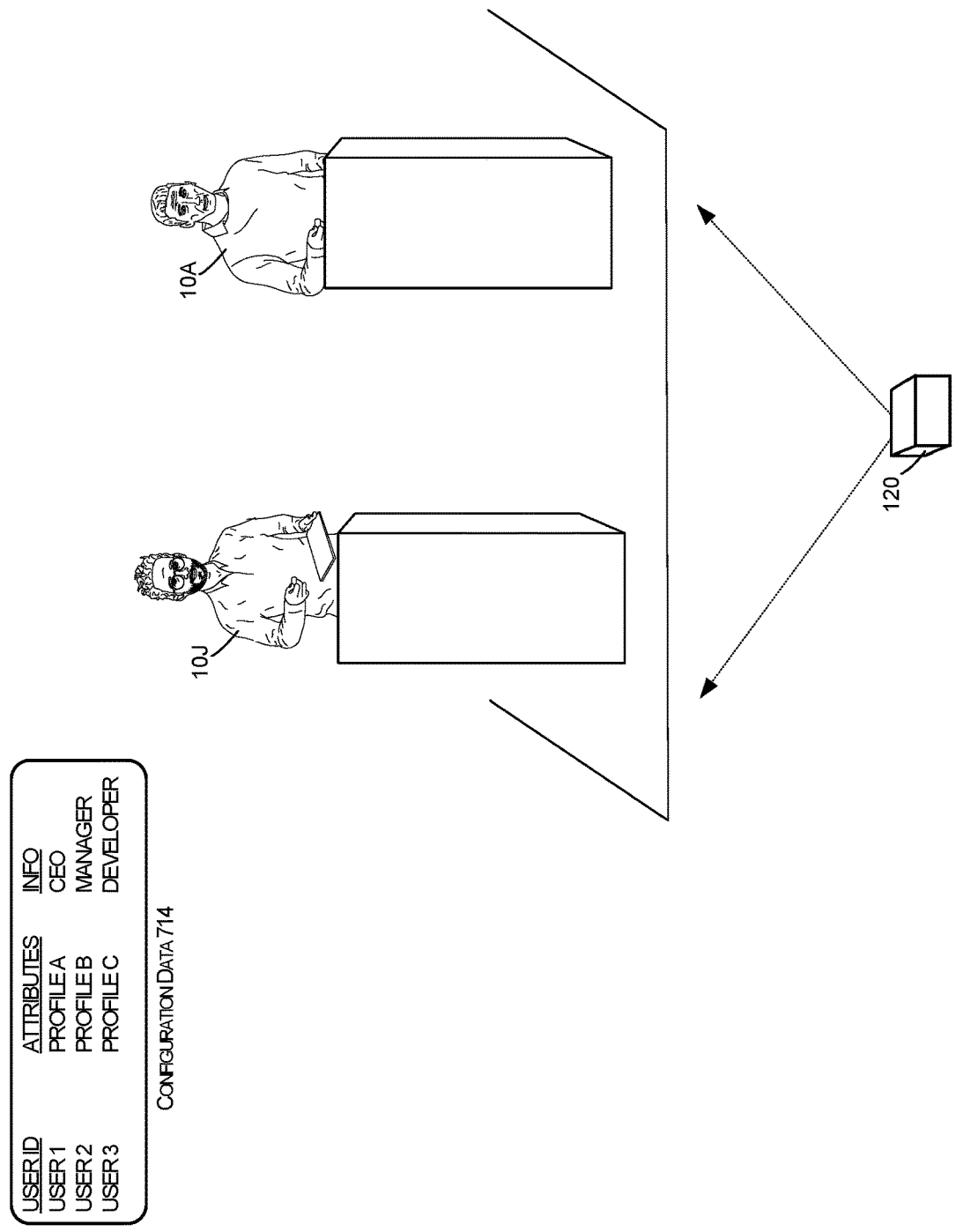
FIG. 6 illustrates an example scenario where facial recognition techniques can be utilized to select a person as a presenter.

FIG. 6 shows one example of a how the system can determine which in-room participant is a presenter using facial recognition technologies. In such embodiments, the system may receive metadata that associates facial features with organizational data. When the system determines that video data captured by a camera 120 indicates the presence of a person having facial features that matches recorded facial features within the metadata, the system can select that person as a presenter and retrieve and display organizational data related to that person. In addition to selecting a particular person as a presenter, the system may display any related information such as their name, title, associated notes, team name, etc.

Figure 10:
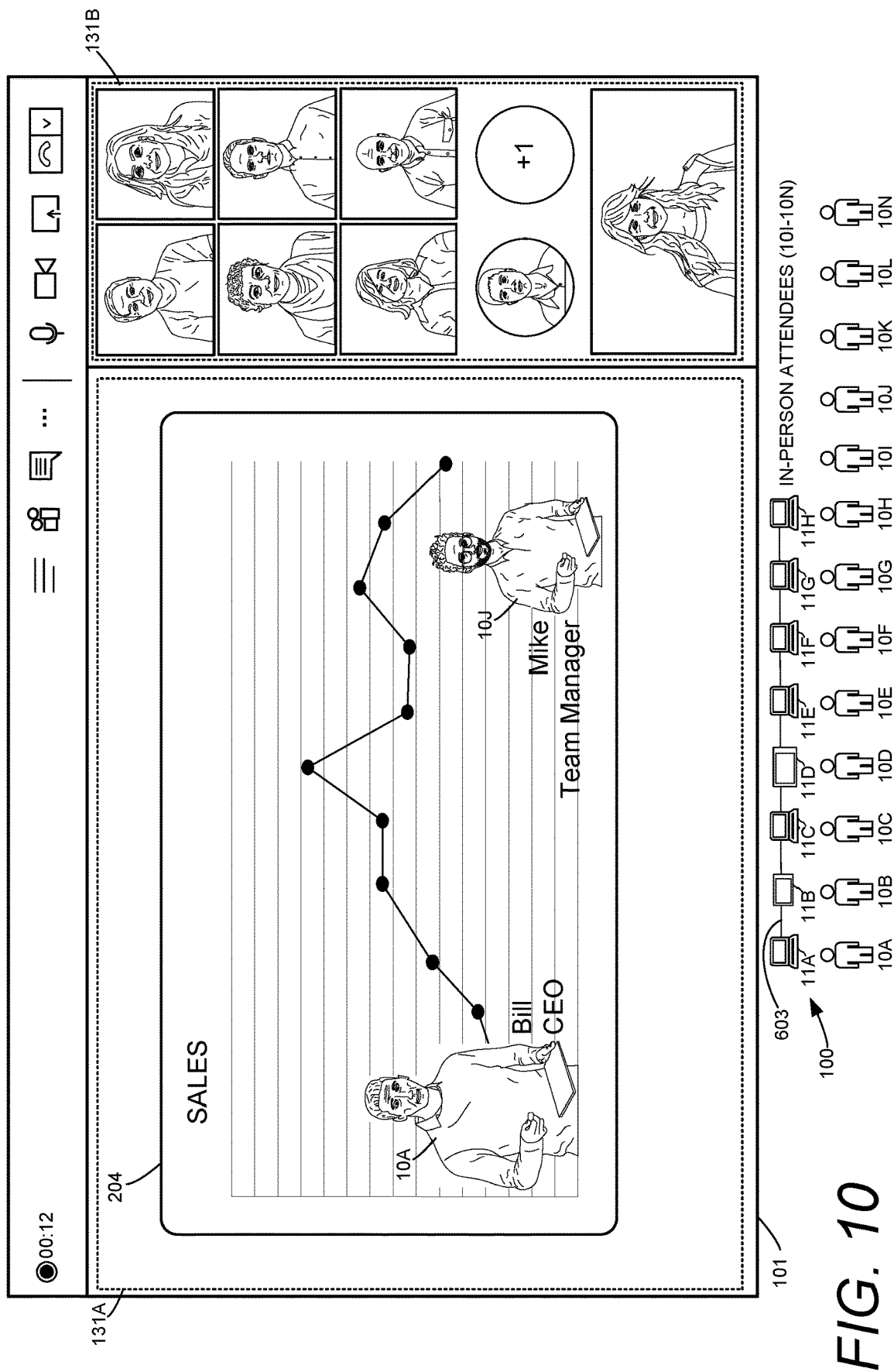
FIG. 10 illustrates an example user interface that can involve a display of an added presenter and a display of organizational data related to each presenter, where the organizational data is retrieved from a database in response to a detection of each persons' identity.

In one illustrative example, the system may receiving one or more metadata files including organizational information pertaining to individual participants of the communication session. The one or more metadata files can associate the individual participants with other data defining facial features of the each of the individual participants. The system can then perform an analysis of the input video stream to identify the person using facial recognition techniques. The system can compare the facial features of the one or more metadata files and the input video stream depicting the person. One or more predetermined physical characteristics of the person 10A can be detected in response to determining that the facial features of the metadata and the facial features captured in the input video stream depicting the person reach a matching threshold. The system can then cause a display of the organizational information concurrently with the rendering of shared content and the filtered rendering of the person that is selected in response to determining that the one or more predetermined physical characteristics of the person 10A is detected. An example of a user interface displaying the organizational information that is retrieved using facial recognition is shown in FIG. 10. As shown, the organizational information can be positioned in association with a rendering to the corresponding presenter.

Figure 7:
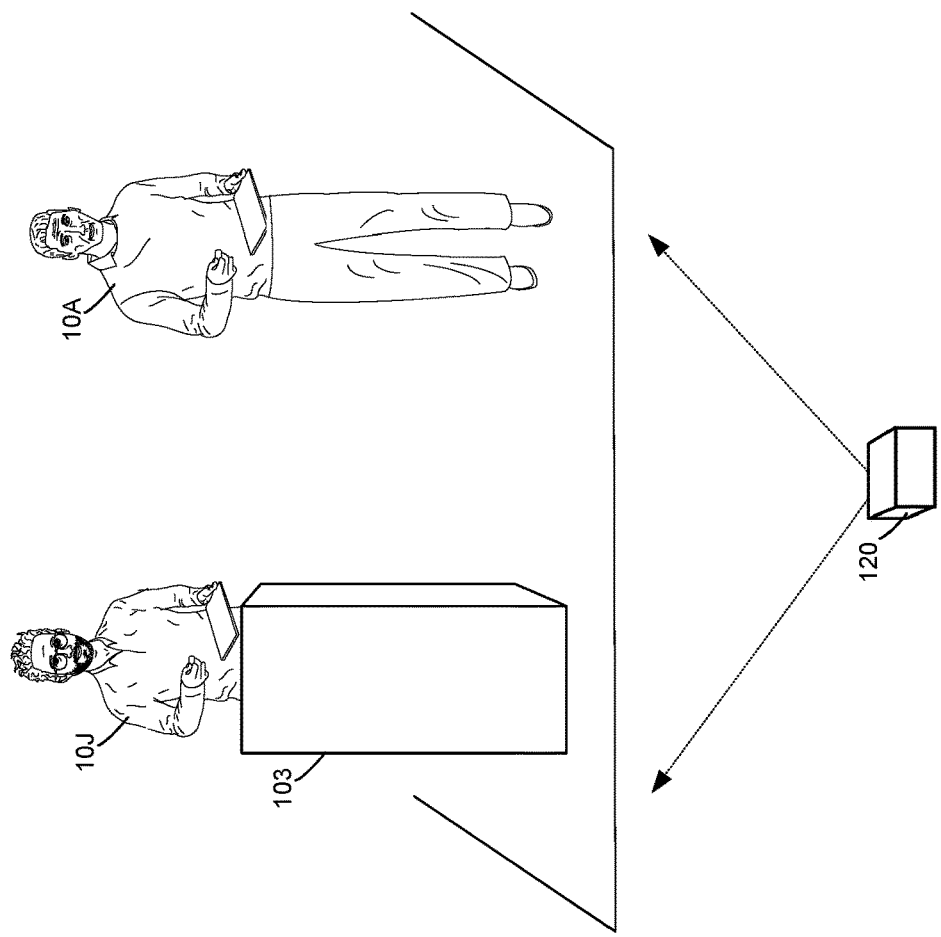
FIG. 7 illustrates an example scenario where a person's association with a real-world object can be utilized to select that person as a presenter.

FIG. 7 shows one example of a how the system can determine which in-room participant is a presenter based on an association between the participant and a real-world object 103, such as a podium. In this example, the system can select a particular person as a presenter when that person has a particular position relative to the podium. This allows the system to select a person as a presenter if they are standing behind the podium, and not select a person as a presenter if they are standing in front of or beside a podium.

In such embodiments, the system may select a real-world object 103 depicted in the input video stream 201. The real-world object 103 can be selected in response to determining that one or more physical properties of the real-world object 103 meets one or more criteria. For instance, a moderator may indicate that a podium is a selected object. And once the podium is selected, a person having a particular position with respect to the podium is selected as the presenter.

In the example of FIG. 7, the participant standing on the left, 10J, is selected as the presenter given their relative position to the podium. The participant standing on the right, 10A, would not be selected as the presenter in this example given that person's position relative to the podium. Configuration data indicating a preferred position, e.g., behind the podium, to the right of the podium, can be utilized by the system to select a user.

Figure 8B:
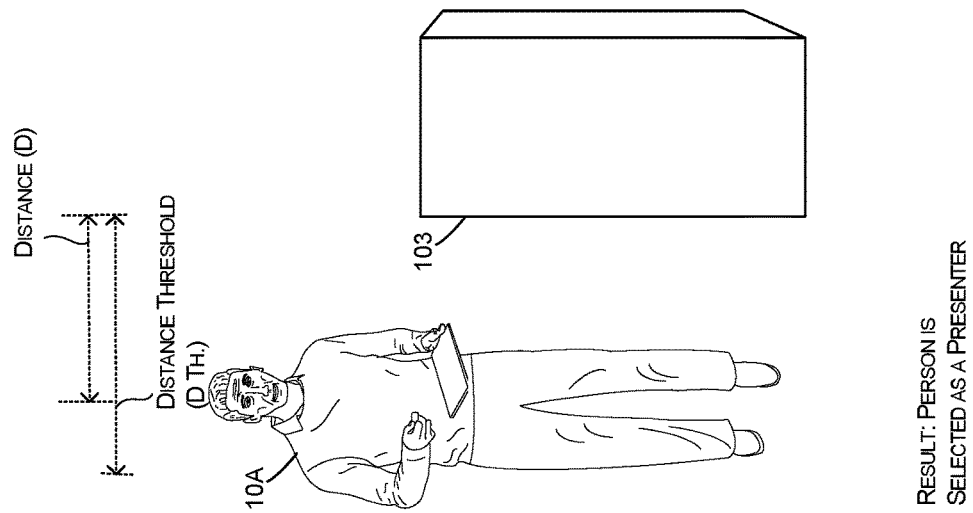
FIG. 8B illustrates an example scenario where a distance between a person and a real-world object can be utilized to select that person as a presenter.

FIGS. 8A and 8B illustrate another example where a person can be selected based on their distance from a real-world object, such as a podium. In this example, the system may only select participants that have a position that is within a threshold distance from the selected object. As shown in FIG. 8A, when a distance (D) between a person 10A and a real-world object 103 is greater than a distance threshold (D Th.), the system will not select the user 10A as a presenter. However, as shown in FIG. 8B, when a distance (D) between a person 10A and a real-world object 103 is less than a distance threshold (D Th.), the system selects the user 10A as a presenter.

In some configurations, the system can utilize a combination of distance and position relative to the real-world object. Thus, a system may only select a person if they are within a predetermined distance from a podium and if they are at a predetermined position relative to the podium. If a person is standing behind a podium but yet further than a threshold distance, they may not be selected as a presenter. However, if they are standing behind a podium and they are within a threshold distance, that person may be selected as a presenter. This example is provided for illustrative purposes and is not to be construed as limiting. They can be appreciated that any distance and any position relative to an object can be utilized for determining if a person is a presenter.

In any of the embodiments disclosed herein, when a person is selected as a presenter, the system can generate a filtered video stream depicting that person. The filtered video stream can then be rendered as an overlay on a rendering of content. In addition, as can be applied to any embodiment disclosed herein, when a person is selected as a presenter, the system can modify permissions for that user and allow them to share content with other users of a communication session. If a person is not selected as a presenter, or no longer meets the criteria to be a presenter, the system may revoke sharing rights to a number of computing devices for audience members. Individuals who are selected as presenters can also cause a system to modify permissions for allowing that person to control audio signals and video signals that are received by other devices.

For instance, if a person stands behind the podium, they may receive rights to share information on a communication session. Their identity can be determined based on image recognition software and that identity can be used to change the permissions. However, when the person moves away from the podium, those granted permissions may be revoked. The system can revoke permissions when a person is no longer selected as a presenter, e.g., when characteristics of a person no longer meet one or more criteria. These features allow a system to control permissions for a person and a display of that person based on that person's association with an object, their location, or other characteristics of that person. Thus, the system can control permissions based on the features disclosed herein for enhancing the security of any stored or shared data. This automation of permissions increases the systems efficiency and increases the security of a system.

Figure 9:
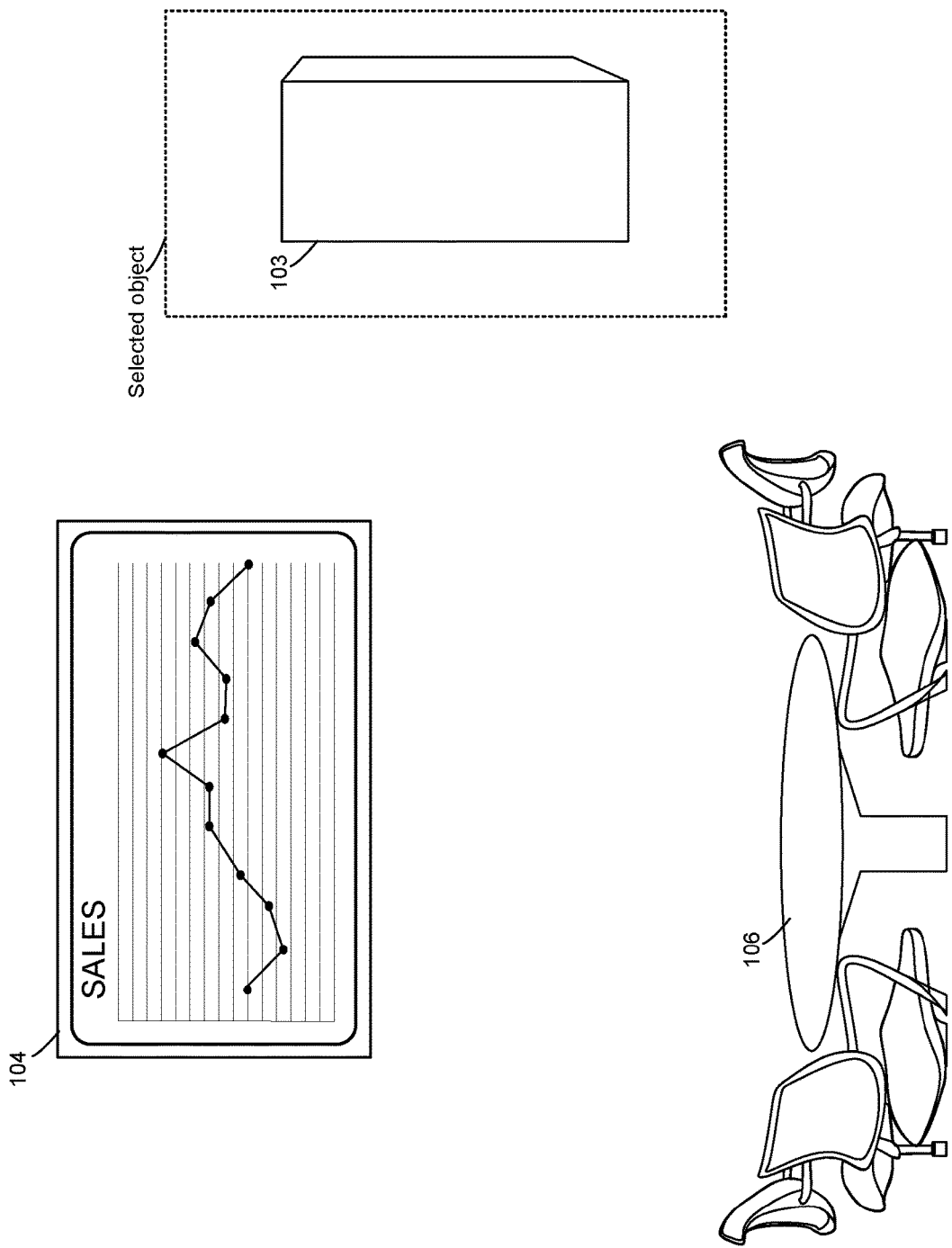
FIG. 9 illustrates an example scenario where physical characteristics of real-world objects are utilized to select an object for processing.

Referring now to FIG. 9, the system can also select the real-world object (also referred to herein as an "object") from a number of real-world objects. An object can be selected based on any of its physical properties such as an objects, size, shape, elevation, color, number of components, etc. For instance, a system can select a podium or a display screen as an object. Once the system selects the object, the selected object is utilized to select a particular person as a presenter. By the selection of an object, a system can adapt to different environments and reduce the need for manual input entries for managing the display arrangements of a communication session.

FIG. 9 shows an example of a first object, a podium 103, and a second object, a display screen 104, and a third object, a table 106. In one illustrative example, the system can select an object based on its position. An object located at predetermined location, e.g., a predetermined area such as a stage, the system can select that object. The predetermined area can be based on map coordinates of a room, GPS coordinates, Wi-Fi signals, or any other data that could indicate an area within a physical environment. The predetermined area can be defined by input data provided by computer or a user having appropriate permissions.

In some configurations, the system can cause a selection of a real-world object 103 depicted in an input video stream 201, where the real-world object 103 is selected in response to an analysis of the input video stream for determining that one or more physical properties of the real-world object 103. In particular object can be selected from a number of objects when the physical properties of that object meet one or more criteria. The physical properties of the object can meet one or more criteria when a position of the real-world object is within a predetermined area. Once the object is selected, a person can be selected in response to determining an association between the real-world object and the person, e.g., when the person is near or positioned in relation to the selected object.

An object can also be selected based on one or more physical properties. For instance, an object having a particular size, e.g., height, width, or length, can be selected. Physical measurements of the device can be determined by an analysis of video data. For instance, the height or width of an object can be determined based on an analysis of an image of the object. In another example, the elevation of an object can be determined, e.g., how high a display screen is from the floor of a room. When one or more dimensions or an elevation of an object meet one or more threshold requirements, that object may be selected. For instance, a table having a particular height can be selected, a podium having a particular height can be selected.

The techniques disclosed herein can also select an object based on the shape of the object. For instance, an object having a particular height and width ratio can be selected. Objects having a predetermined shape such as a circle, square, or other predetermined shapes can be selected. A user input can also be utilized to selected object. For instance, a moderator for a meeting can view a rendering of a room in the system can automatically highlight objects within the room. For instance, the system may indicate that a room may have a table, desk and podium. The user can select the podium by a manual input or another input gesture and in response, the system can select that object for processing. The selected object can then be utilized to identify presenters from other participants based on the presenter's association with the selected object.

In some configurations, the system can also identify additional presenters and add those presenters to a rendering of the content. Additional presenters can be selected by a number of factors including an activity level associated with additional speakers. Activity levels may be based on a volume of speech, a quantity of spoken words, a frequency of spoken words, and movement within a video stream. In some configurations, when additional presenters are identified, the system can dynamically add "cutout renderings" of the additional presenters in the presentation video stream 204. This modified version of the presentation video stream can be displayed to a display screen, such as an in-room projection screen, for in-room attendees 10B-10H. The modified version of the presentation video stream can be also displayed on devices 11B-11H for online attendees 10I-10N. FIG. 10 illustrates an example of a modified version of the presentation video stream rendered on a user interface 101, which may have a first display area 131A for showing shared content and a second display area 131B for showing a number of attendees of a meeting. In this example, the additional speaker 10J can be included in the modified version of the presentation video stream with the first user 10A and the shared content.

In one example process, the system can detect a presence of an additional speaker of the communication session. The additional speaker can be detected based on an activity level of the additional speaker. The activity level can be based on at least one of a threshold volume level generated by an audio stream generated by a computing device of the additional speaker, a frequency or quantity of words spoken by the additional speaker, a video stream received from a selected camera, or a position of the additional speaker relative to a real-world object. The system, as shown in FIG. 10, can then modify the presentation video to add a rendering of the additional speaker 10J in response to determining that the activity level of the additional speaker exceeds an activity threshold, wherein the modification of the presentation video causes a display of the rendering of the additional speaker concurrently with the rendering of shared content and the filtered rendering of the person that is selected in response to determining the association between the real-world object and the person. The person that is added can be a an online attendee or an in-room attendee.

Figure 11:
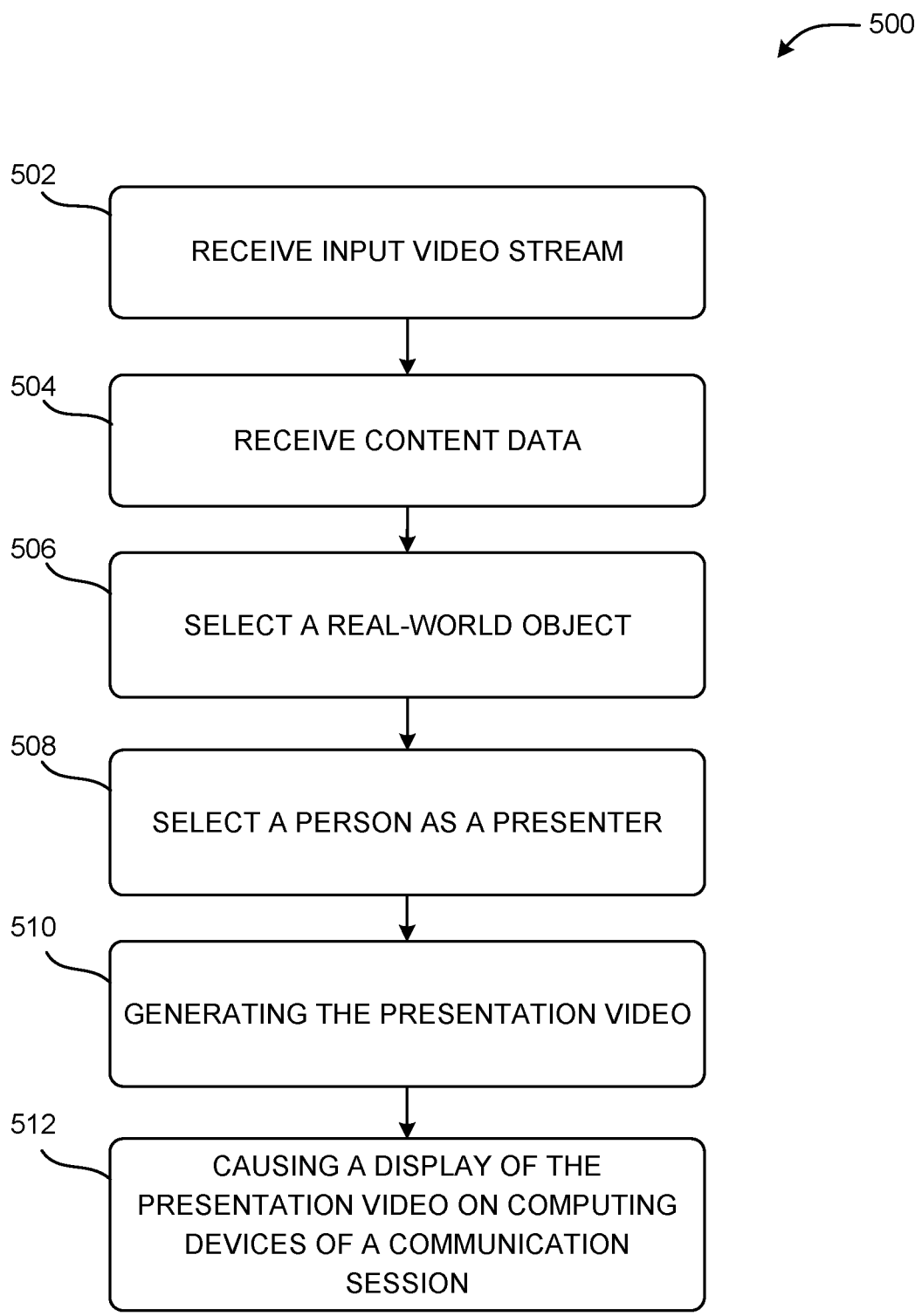
FIG. 11 is a flow diagram showing aspects of a routine for utilizing the network effect of end-user viral adoption of services and applications by clustering users based on characteristics of requests to configure new tenants.

FIG. 11 is a diagram illustrating aspects of a routine 500 for providing automatic composition of a presentation video of shared content with a selected presenter. It should be understood by those of ordinary skill in the art that the operations of the methods disclosed herein are not necessarily presented in any particular order and that performance of some or all of the operations in an alternative order is possible and is contemplated. The operations have been presented in the demonstrated order for ease of description and illustration. Operations may be added, omitted, performed together, and/or performed simultaneously, without departing from the scope of the appended claims.

It should also be understood that the illustrated methods can end at any time and need not be performed in their entirety. Some or all operations of the methods, and/or substantially equivalent operations, can be performed by execution of computer-readable instructions included on a computer-storage media, as defined herein. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like. Although the example routine described below is operating on a system, e.g., one or more computing devices, it can be appreciated that this routine can be performed on any computing system which may include any number of computers working in concert to perform the operations disclosed herein.

Thus, it should be appreciated that the logical operations described herein are implemented as a sequence of computer implemented acts or program modules running on a computing system such as those described herein and/or as interconnected machine logic circuits or circuit modules within the computing system. The implementation is a matter of choice dependent on the performance and other requirements of the computing system. Accordingly, the logical operations may be implemented in software, in firmware, in special purpose digital logic, and any combination thereof.

Additionally, the operations illustrated in FIG. 11 and the other FIGURES can be implemented in association with the example presentation user interfaces UI described above. For instance, the various devices and/or modules described herein can generate, transmit, receive, and/or display data associated with content of a communication session e.g., live content, broadcasted event, recorded content, etc. and/or a presentation UI that includes renderings of one or more participants of remote computing devices, avatars, channels, chat sessions, video streams, images, virtual objects, and/or applications associated with a communication session.

The routine 500 includes an operation 502 where the system can receive an input video stream. The input video stream can come from a camera within a room for in-person meeting attendees. The camera can be directed to one or more individuals in the room. The input video stream can also come from multiple cameras within the room, where each camera has a different perspective of different individuals.

The routine 500 can also include an operation 504 for receiving content data. The content data can be in the form of a video stream that includes a rendering of shared content. The content data can also be in the form of a file or other data structure comprising shared content. The shared content can include a file, video, or any other data structure that includes content that is expressly shared by an individual having appropriate permissions for a communication session.

The routine 500 can also include an operation 506 for causing a selection of a real-world object 103 depicted in the input video stream 201. The real-world object 103 is selected in response to determining that one or more physical properties of the real-world object 103 meets one or more criteria. For instance, a podium that is depicted in the video stream can meet one or more criteria if the podium is in a predetermined position or has a predetermined size or shape. The podium can also be detected by the use of an identifier such as a number or other text or code specified on the podium. For instance, a stage may have a number of podiums but the system may only select one of the podiums based on the position of the podium and/or a code label on the selected podium. This example is provided for illustrative purposes and is not to be construed as limiting. It can be appreciated that any real-world physical object can be selected in operation 506. In addition, it can be appreciated that other types of selection processes can be involved including but not limited to a user selection of a physical object. This can include an input of a user for selecting a particular object from a number of objects depicted in an image.

The routine can also include an operation 508 for selecting a person as a presenter. This can include an analysis of the input video stream to determine if a person depicted in the video stream is to be selected as a presenter. This operation can include any of the disclosed techniques including a selection of a person who has a particular position or orientation with respect to the selected object. The selection of the person can be based on any association between the person and an object including but not limited to a detection of a person touching the object. The system may also detect whether a person has touched the object a number of times or has a frequency of physical interaction with the object. For instance, if a person approaches a podium and places their hands on the podium, that person can be selected as a presenter. If a person walks by a podium a number of times and that number of times exceeds a predetermined threshold, that person may be selected as a presenter. Detection of a predetermined frequency of any type of interaction can cause a system to select that person as a presenter. In some embodiments, if a system detects that a person has a predetermined frequency of interactions or a total number of interactions, e.g., touches an object, walks by an object, stands behind an object, the system will select that person as a presenter. In some embodiments, if a system detects that a person does not have a predetermined frequency of interactions, touches the object, walks by an object, stands behind an object, the system will not select that person as a presenter.

These interactions can also be time-based. In some embodiments, if a system detects that a person performs an interaction for a threshold time, e.g., touches an object, walks by an object, stands behind an object, the system will select that person as a presenter. In some embodiments, if a system detects that a person does not perform an interaction for a threshold time, e.g., touches an object, walks by an object, stands behind an object, the system will not select that person as a presenter.

At operation 510, the system can generate a presentation video. In some configurations, the presentation video 204 can include the rendering of shared content 102 and a rendering of the person 10A that is selected as the presenter, wherein the person is selected in response to determining the association between the real-world object 103 and the person 10A. In some configurations, the rendering of the person can be a filtered "cutout" where the system filters any image of a physical background behind the person.

At operation 512, the system can cause a display of the presentation video 204 on a plurality of computing devices 11B-11N associated with a plurality of participants 10B-10N of a communication session 603, where the presentation video 204 comprises the rendering of shared content 102 and the rendering of the person 10A that is selected as the presenter in responds to determining the association between the real-world object 103 and the person 10A.

In some configurations, the routine can include operations described in the following clauses.

Clause A: A computer-implemented method for composing a presentation video 204 from an input video stream 201 depicting a person 10A and a rendering of shared content 102, the computer-implemented method configured for execution on a computing system 100 comprising: causing a selection of a real-world object 103 depicted in the input video stream 201, the real-world object 103 is selected in response to determining that one or more physical properties of the real-world object 103 meets one or more criteria; analyzing, by the computing system 100, the input video stream 201 to select the person 10A depicted in the input video stream 201 as a presenter, wherein the selection of the person 10A is in response to determining an association between the real-world object 103 and the person 10A; generating the presentation video 204 comprising the rendering of shared content 102 and a rendering of the person 10A that is selected as the presenter in response to determining the association between the real-world object 103 and the person 10A; and causing a display of the presentation video 204 on a plurality of computing devices 11B-11N associated with a plurality of participants 10B-10N of a communication session 603, wherein the presentation video 204 comprises the rendering of shared content 102 and the rendering of the person 10A that is selected as the presenter in responds to determining the association between the real-world object 103 and the person 10A.

Clause B: The computer-implemented method of Clause A, wherein the rendering of shared content is displayed on a screen positioned in an environment associated with the person, wherein the rendering of shared content is captured, at least in part, by a camera generating the input video stream depicting the presenter, wherein the association between the real-world object and the person is determined in response to detecting that the person, the shared content, and the real-world object are concurrently depicted in the input video stream, an embodiment where the shared content, e.g., a slide, video, or document, is projected on a screen in a room.

Clause C: The computer-implemented method of Clauses A through B, further comprising: detecting a presence of an additional speaker of the communication session, wherein the additional speaker is detected based on an activity level of the additional speaker, the activity level being based on at least one of a threshold volume level generated by an audio stream generated by a computing device of the additional speaker, a frequency or quantity of words spoken by the additional speaker, or a position of the additional speaker relative to the real-world object; and modifying the presentation video to add a rendering of the additional speaker in response to determining that the activity level of the additional speaker exceeds an activity threshold, wherein the modification of the presentation video causes a display of the rendering of the additional speaker concurrently with the rendering of shared content and the rendering of the person that is selected in responds to determining the association between the real-world object and the person, wherein the system detects additional speakers join to speak or ask questions online and/or in-room and dynamically adds a cutout of the new person onto the content.

Clause D: The computer-implemented method of Clauses A through C, wherein the selection of a real-world object is based on a process of analyzing the input video stream to determine when the one or more physical properties of the real-world object meets the one or more criteria, wherein the one or more physical properties of the real-world object meets one or more criteria when a position of the real-world object is within a predetermined area, the selection of the object, e.g., the podium, is based on a position of the object, e.g., object on a stage, object within an area of the camera's field of view, where the selection of the object, e.g., the podium, is based on a position of the object, e.g., object on a stage, object within an area of the camera's field of view, etc.

Clause E: The computer-implemented method of Clauses A through D, where the selection of the object, e.g., the podium, is based on a size or shape of the object, e.g., object having a certain height, shape, color, reflectivity, or predetermined text, wherein the selection of a real-world object is based on a process of analyzing the input video stream to determine when the one or more physical properties of the real-world object meets the one or more criteria, wherein the one or more physical properties of the real-world object meets one or more criteria when a size of the real-world object is exceeds a size threshold or when a shape of the real-world object has a threshold match with a predetermined shape.

Clause F: The computer-implemented method of Clauses A through E, wherein determining that one or more physical properties of the real-world object meets one or more criteria comprises: displaying a rendering of the real-world object; and receiving a user input indicating a selection of the real-world object based on the display of the rendering of the physical properties of the real-world object, this can include a selection of the object, e.g., the podium, that is based on a user selection of the object, e.g., a user can select a specific podium over other podiums.

Clause G: The computer-implemented method of Clauses A through F, where the selection of the person is based on their position relative to the object, e.g., a person standing behind the podium, wherein the selection of the person is in response to determining the association between the real-world object and the person, wherein the association is determined when an analysis of the input video stream indicates that the person is at a predetermined position relative to the real-world object.

Clause H: The computer-implemented method of Clauses A through G, the selection of the person is based on a distance between the object and the person, e.g., a person within 4 feet of the podium is the speaker, wherein the selection of the person is in response to determining the association between the real-world object and the person, wherein the association is determined when an analysis of the input video stream indicates that a distance between the real-world object and the person is less than a threshold distance.

Clause I: The computer-implemented method of Clauses A through H, a process of how the cutout of the person is generated, the method can include any combination of these features, where the method further comprises: receiving the input video stream from a camera 120 directed toward the person, wherein the input video stream comprises an image of the person 10A and an image of a physical background 105 that is positioned behind the person 10A relative to the camera 120; applying a processing filter to the input video stream to remove the image of the physical background 105 from the input video stream, the processing filter generating a filtered video stream 203 of the person comprising the rendering of the person without the image of the physical background 105, wherein the filtered video stream 203 of the person is shaped according to an outline of the person; and scaling the filtered video stream 203 of the person to a size for compatibility with the rendering of shared content; and inserting the filtered video stream 203 of the person that is shaped according to the outline of the person in the presentation video, wherein the filtered video stream 203 is positioned as an overlay over the shared content.

Figure 12:
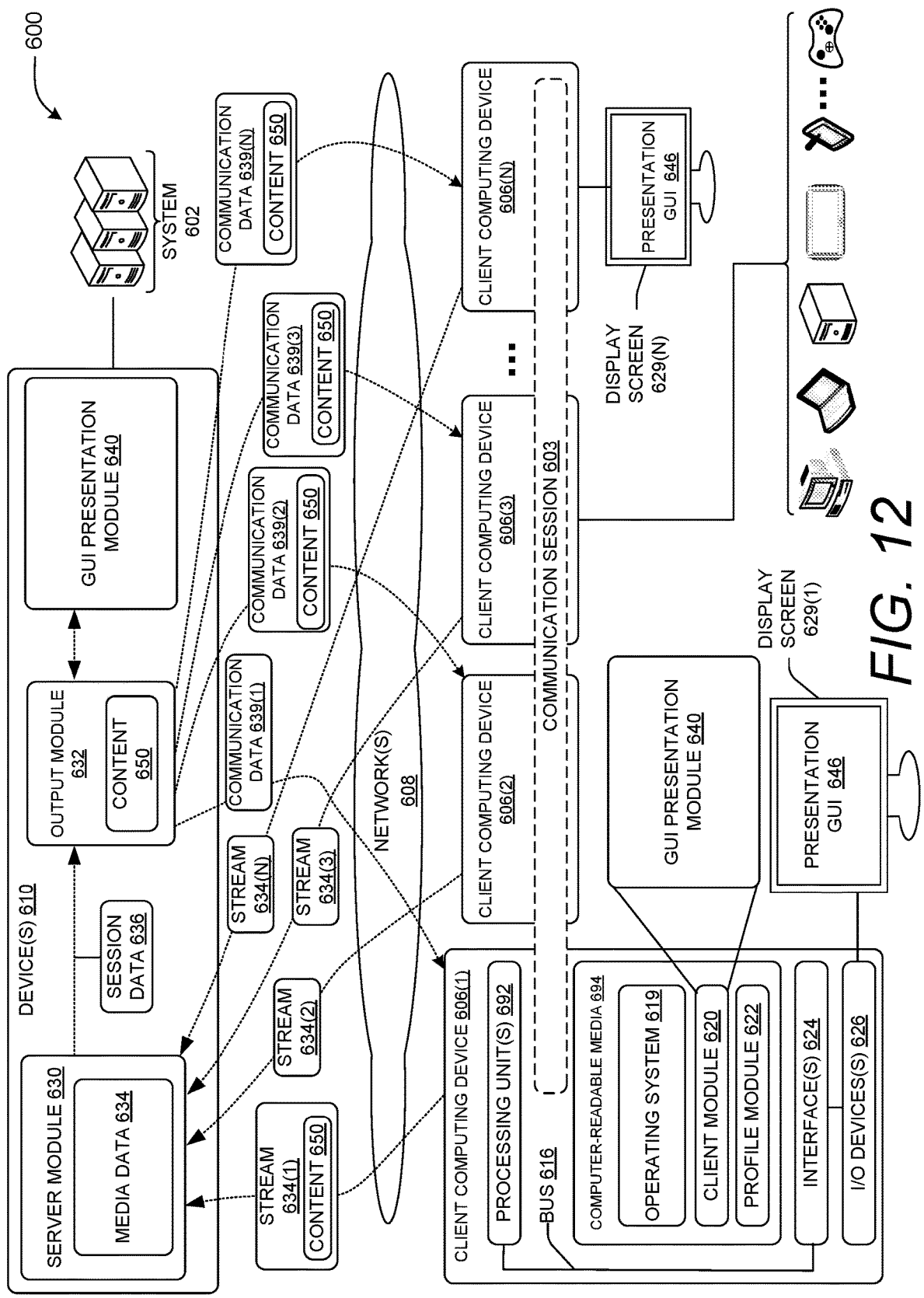
FIG. 12 is a computer architecture diagram illustrating an illustrative computer hardware and software architecture for a computing system capable of implementing aspects of the techniques and technologies presented herein.

FIG. 12 is a diagram illustrating an example environment 600 in which a system 602 can implement the techniques disclosed herein. It should be appreciated that the above-described subject matter may be implemented as a computer-controlled apparatus, a computer process, a computing system, or as an article of manufacture such as a computer-readable storage medium. The operations of the example methods are illustrated in individual blocks and summarized with reference to those blocks. The methods are illustrated as logical flows of blocks, each block of which can represent one or more operations that can be implemented in hardware, software, or a combination thereof. In the context of software, the operations represent computer-executable instructions stored on one or more computer-readable media that, when executed by one or more processors, enable the one or more processors to perform the recited operations.

Generally, computer-executable instructions include routines, programs, objects, modules, components, data structures, and the like that perform particular functions or implement particular abstract data types. The order in which the operations are described is not intended to be construed as a limitation, and any number of the described operations can be executed in any order, combined in any order, subdivided into multiple sub-operations, and/or executed in parallel to implement the described processes. The described processes can be performed by resources associated with one or more device(s) such as one or more internal or external CPUs or GPUs, and/or one or more pieces of hardware logic such as field-programmable gate arrays ("FPGAs"), digital signal processors ("DSPs"), or other types of accelerators.

All of the methods and processes described above may be embodied in, and fully automated via, software code modules executed by one or more general purpose computers or processors. The code modules may be stored in any type of computer-readable storage medium or other computer storage device, such as those described below. Some or all of the methods may alternatively be embodied in specialized computer hardware, such as that described below.

Any routine descriptions, elements or blocks in the flow diagrams described herein and/or depicted in the attached figures should be understood as potentially representing modules, segments, or portions of code that include one or more executable instructions for implementing specific logical functions or elements in the routine. Alternate implementations are included within the scope of the examples described herein in which elements or functions may be deleted, or executed out of order from that shown or discussed, including substantially synchronously or in reverse order, depending on the functionality involved as would be understood by those skilled in the art.

In some implementations, a system 602 may function to collect, analyze, and share data that is displayed to users of a communication session 603. As illustrated, the communication session 603 may be implemented between a number of client computing devices 606(1) through 606(N) (where N is a number having a value of two or greater) that are associated with or are part of the system 602. The client computing devices 606(1) through 606(N) enable users, also referred to as individuals, to participate in the communication session 603.

In this example, the communication session 603 is hosted, over one or more network(s) 608, by the system 602. That is, the system 602 can provide a service that enables users of the client computing devices 606(1) through 606(N) to participate in the communication session 603 (e.g., via a live viewing and/or a recorded viewing). Consequently, a "participant" to the communication session 603 can comprise a user and/or a client computing device (e.g., multiple users may be in a room participating in a communication session via the use of a single client computing device), each of which can communicate with other participants. As an alternative, the communication session 603 can be hosted by one of the client computing devices 606(1) through 606(N) utilizing peer-to-peer technologies. The system 602 can also host chat conversations and other team collaboration functionality (e.g., as part of an application suite).

In some implementations, such chat conversations and other team collaboration functionality are considered external communication sessions distinct from the communication session 603. A computing system 602 that collects participant data in the communication session 603 may be able to link to such external communication sessions. Therefore, the system may receive information, such as date, time, session particulars, and the like, that enables connectivity to such external communication sessions. In one example, a chat conversation can be conducted in accordance with the communication session 603. Additionally, the system 602 may host the communication session 603, which includes at least a plurality of participants co-located at a meeting location, such as a meeting room or auditorium, or located in disparate locations. A communication session 603 can include a start time and an end time, which can determine when video streams and live audio can be shared. Text and content can be shared outside of the start time and end time.

In examples described herein, client computing devices 606(1) through 606(N) participating in the communication session 603 are configured to receive and render for display, on a user interface of a display screen, communication data. The communication data can comprise a collection of various instances, or streams, of live content and/or recorded content. The collection of various instances, or streams, of live content and/or recorded content may be provided by one or more cameras, such as video cameras. For example, an individual stream of live or recorded content can comprise media data associated with a video feed provided by a video camera (e.g., audio and visual data that capture the appearance and speech of a user participating in the communication session). In some implementations, the video feeds may comprise such audio and visual data, one or more still images, and/or one or more avatars. The one or more still images may also comprise one or more avatars.

Another example of an individual stream of live or recorded content can comprise media data that includes an avatar of a user participating in the communication session along with audio data that captures the speech of the user. Yet another example of an individual stream of live or recorded content can comprise media data that includes a file displayed on a display screen along with audio data that captures the speech of a user. Accordingly, the various streams of live or recorded content within the communication data enable a remote meeting to be facilitated between a group of people and the sharing of content within the group of people. In some implementations, the various streams of live or recorded content within the communication data may originate from a plurality of co-located video cameras, positioned in a space, such as a room, to record or stream live a presentation that includes one or more individuals presenting and one or more individuals consuming presented content.

A participant or attendee can view content of the communication session 603 live as activity occurs, or alternatively, via a recording at a later time after the activity occurs. In the examples described herein, client computing devices 606(1) through 606(N) participating in the communication session 603 are configured to receive and render for display, on a user interface of a display screen, communication data. The communication data can comprise a collection of various instances, or streams, of live and/or recorded content. For example, an individual stream of content can comprise media data associated with a video feed (e.g., audio and visual data that capture the appearance and speech of a user participating in the communication session). Another example of an individual stream of content can comprise media data that includes an avatar of a user participating in the conference session along with audio data that captures the speech of the user. Yet another example of an individual stream of content can comprise media data that includes a content item displayed on a display screen and/or audio data that captures the speech of a user. Accordingly, the various streams of content within the communication data enable a meeting or a broadcast presentation to be facilitated amongst a group of people dispersed across remote locations.

A participant or attendee to a communication session is a person that is in range of a camera, or other image and/or audio capture device such that actions and/or sounds of the person which are produced while the person is viewing and/or listening to the content being shared via the communication session can be captured (e.g., recorded). For instance, a participant may be sitting in a crowd viewing the shared content live at a broadcast location where a stage presentation occurs. Or a participant may be sitting in an office conference room viewing the shared content of a communication session with other colleagues via a display screen. Even further, a participant may be sitting or standing in front of a personal device (e.g., tablet, smartphone, computer, etc.) viewing the shared content of a communication session alone in their office or at home.

The system 602 of FIG. 12 includes device(s) 610. The device(s) 610 and/or other components of the system 602 can include distributed computing resources that communicate with one another and/or with the client computing devices 606(1) through 606(N) via the one or more network(s) 608. In some examples, the system 602 may be an independent system that is tasked with managing aspects of one or more communication sessions such as communication session 603. As an example, the system 602 may be managed by entities such as SLACK, WEBEX, GOTOMEETING, GOOGLE HANGOUTS, etc.

Network(s) 608 may include, for example, public networks such as the Internet, private networks such as an institutional and/or personal intranet, or some combination of private and public networks. Network(s) 608 may also include any type of wired and/or wireless network, including but not limited to local area networks ("LANs"), wide area networks ("WANs"), satellite networks, cable networks, Wi-Fi networks, WiMax networks, mobile communications networks (e.g., 3G, 4G, and so forth) or any combination thereof. Network(s) 608 may utilize communications protocols, including packet-based and/or datagram-based protocols such as Internet protocol ("IP"), transmission control protocol ("TCP"), user datagram protocol ("UDP"), or other types of protocols. Moreover, network(s) 608 may also include a number of devices that facilitate network communications and/or form a hardware basis for the networks, such as switches, routers, gateways, access points, firewalls, base stations, repeaters, backbone devices, and the like.

In some examples, network(s) 608 may further include devices that enable connection to a wireless network, such as a wireless access point ("WAP"). Examples support connectivity through WAPs that send and receive data over various electromagnetic frequencies (e.g., radio frequencies), including WAPs that support Institute of Electrical and Electronics Engineers ("IEEE") 802.11 standards (e.g., 802.11g, 802.11n, 802.11ac and so forth), and other standards.

In various examples, device(s) 610 may include one or more computing devices that operate in a cluster or other grouped configuration to share resources, balance load, increase performance, provide fail-over support or redundancy, or for other purposes. For instance, device(s) 610 may belong to a variety of classes of devices such as traditional server-type devices, desktop computer-type devices, and/or mobile-type devices. Thus, although illustrated as a single type of device or a server-type device, device(s) 610 may include a diverse variety of device types and are not limited to a particular type of device. Device(s) 610 may represent, but are not limited to, server computers, desktop computers, web-server computers, personal computers, mobile computers, laptop computers, tablet computers, or any other sort of computing device.

A client computing device (e.g., one of client computing device(s) 606(1) through 606(N)) (each of which are also referred to herein as a "data processing system") may belong to a variety of classes of devices, which may be the same as, or different from, device(s) 610, such as traditional client-type devices, desktop computer-type devices, mobile-type devices, special purpose-type devices, embedded-type devices, and/or wearable-type devices. Thus, a client computing device can include, but is not limited to, a desktop computer, a game console and/or a gaming device, a tablet computer, a personal data assistant ("PDA"), a mobile phone/tablet hybrid, a laptop computer, a telecommunication device, a computer navigation type client computing device such as a satellite-based navigation system including a global positioning system ("GPS") device, a wearable device, a virtual reality ("VR") device, an augmented reality ("AR") device, an implanted computing device, an automotive computer, a network-enabled television, a thin client, a terminal, an Internet of Things ("IoT") device, a work station, a media player, a personal video recorder ("PVR"), a set-top box, a camera, an integrated component (e.g., a peripheral device) for inclusion in a computing device, an appliance, or any other sort of computing device. Moreover, the client computing device may include a combination of the earlier listed examples of the client computing device such as, for example, desktop computer-type devices or a mobile-type device in combination with a wearable device, etc.

Client computing device(s) 606(1) through 606(N) of the various classes and device types can represent any type of computing device having one or more data processing unit(s) 692 operably connected to computer-readable media 694 such as via a bus 616, which in some instances can include one or more of a system bus, a data bus, an address bus, a PCI bus, a Mini-PCI bus, and any variety of local, peripheral, and/or independent buses.

Executable instructions stored on computer-readable media 694 may include, for example, an operating system 619, a client module 620, a profile module 622, and other modules, programs, or applications that are loadable and executable by data processing units(s) 692.

Client computing device(s) 606(1) through 606(N) may also include one or more interface(s) 624 to enable communications between client computing device(s) 606(1) through 606(N) and other networked devices, such as device(s) 610, over network(s) 608. Such network interface(s) 624 may include one or more network interface controllers (NICs) or other types of transceiver devices to send and receive communications and/or data over a network. Moreover, client computing device(s) 606(1) through 606(N) can include input/output ("I/O") interfaces (devices) 626 that enable communications with input/output devices such as user input devices including peripheral input devices (e.g., a game controller, a keyboard, a mouse, a pen, a voice input device such as a microphone, a video camera for obtaining and providing video feeds and/or still images, a touch input device, a gestural input device, and the like) and/or output devices including peripheral output devices (e.g., a display, a printer, audio speakers, a haptic output device, and the like). FIG. 12 illustrates that client computing device 606(1) is in some way connected to a display device (e.g., a display screen 629(N)), which can display a UI according to the techniques described herein.

In the example environment 600 of FIG. 12, client computing devices 606(1) through 606(N) may use their respective client modules 620 to connect with one another and/or other external device(s) in order to participate in the communication session 603, or in order to contribute activity to a collaboration environment. For instance, a first user may utilize a client computing device 606(1) to communicate with a second user of another client computing device 606(2). When executing client modules 620, the users may share data, which may cause the client computing device 606(1) to connect to the system 602 and/or the other client computing devices 606(2) through 606(N) over the network(s) 608.

The client computing device(s) 606(1) through 606(N) may use their respective profile modules 622 to generate participant profiles (not shown in FIG. 12) and provide the participant profiles to other client computing devices and/or to the device(s) 610 of the system 602. A participant profile may include one or more of an identity of a user or a group of users (e.g., a name, a unique identifier ("ID"), etc.), user data such as personal data, machine data such as location (e.g., an IP address, a room in a building, etc.) and technical capabilities, etc. Participant profiles may be utilized to register participants for communication sessions.

As shown in FIG. 12, the device(s) 610 of the system 602 include a server module 630 and an output module 632. In this example, the server module 630 is configured to receive, from individual client computing devices such as client computing devices 606(1) through 606(N), media streams 634(1) through 634(N). As described above, media streams can comprise a video feed (e.g., audio and visual data associated with a user), audio data which is to be output with a presentation of an avatar of a user (e.g., an audio only experience in which video data of the user is not transmitted), text data (e.g., text messages), file data and/or screen sharing data (e.g., a document, a slide deck, an image, a video displayed on a display screen, etc.), and so forth. Thus, the server module 630 is configured to receive a collection of various media streams 634(1) through 634(N) during a live viewing of the communication session 603 (the collection being referred to herein as "media data 634"). In some scenarios, not all of the client computing devices that participate in the communication session 603 provide a media stream. For example, a client computing device may only be a consuming, or a "listening," device such that it only receives content associated with the communication session 603 but does not provide any content to the communication session 603.

In various examples, the server module 630 can select aspects of the media streams 634 that are to be shared with individual ones of the participating client computing devices 606(1) through 606(N). Consequently, the server module 630 may be configured to generate session data 636 based on the streams 634 and/or pass the session data 636 to the output module 632. Then, the output module 632 may communicate communication data 639 to the client computing devices (e.g., client computing devices 606(1) through 606(3) participating in a live viewing of the communication session). The communication data 639 may include video, audio, and/or other content data, provided by the output module 632 based on content 650 associated with the output module 632 and based on received session data 636. The content 650 can include the streams 634 or other shared data, such as an image file, a spreadsheet file, a slide deck, a document, etc. The streams 634 can include a video component depicting images captured by an I/O device 626 on each client computer.

As shown, the output module 632 transmits communication data 639(1) to client computing device 606(1), and transmits communication data 639(2) to client computing device 606(2), and transmits communication data 639(3) to client computing device 606(3), etc. The communication data 639 transmitted to the client computing devices can be the same or can be different (e.g., positioning of streams of content within a user interface may vary from one device to the next).

In various implementations, the device(s) 610 and/or the client module 620 can include GUI presentation module 640. The GUI presentation module 640 may be configured to analyze communication data 639 that is for delivery to one or more of the client computing devices 606. Specifically, the UI presentation module 640, at the device(s) 610 and/or the client computing device 606, may analyze communication data 639 to determine an appropriate manner for displaying video, image, and/or content on the display screen 629 of an associated client computing device 606. In some implementations, the GUI presentation module 640 may provide video, image, and/or content to a presentation GUI 646 rendered on the display screen 629 of the associated client computing device 606. The presentation GUI 646 may be caused to be rendered on the display screen 629 by the GUI presentation module 640. The presentation GUI 646 may include the video, image, and/or content analyzed by the GUI presentation module 640.

In some implementations, the presentation GUI 646 may include a plurality of sections or grids that may render or comprise video, image, and/or content for display on the display screen 629. For example, a first section of the presentation GUI 646 may include a video feed of a presenter or individual, a second section of the presentation GUI 646 may include a video feed of an individual consuming meeting information provided by the presenter or individual. The GUI presentation module 640 may populate the first and second sections of the presentation GUI 646 in a manner that properly imitates an environment experience that the presenter and the individual may be sharing.

In some implementations, the GUI presentation module 640 may enlarge or provide a zoomed view of the individual represented by the video feed in order to highlight a reaction, such as a facial feature, the individual had to the presenter. In some implementations, the presentation GUI 646 may include a video feed of a plurality of participants associated with a meeting, such as a general communication session. In other implementations, the presentation GUI 646 may be associated with a channel, such as a chat channel, enterprise Teams channel, or the like. Therefore, the presentation GUI 646 may be associated with an external communication session that is different from the general communication session.

Figure 13:
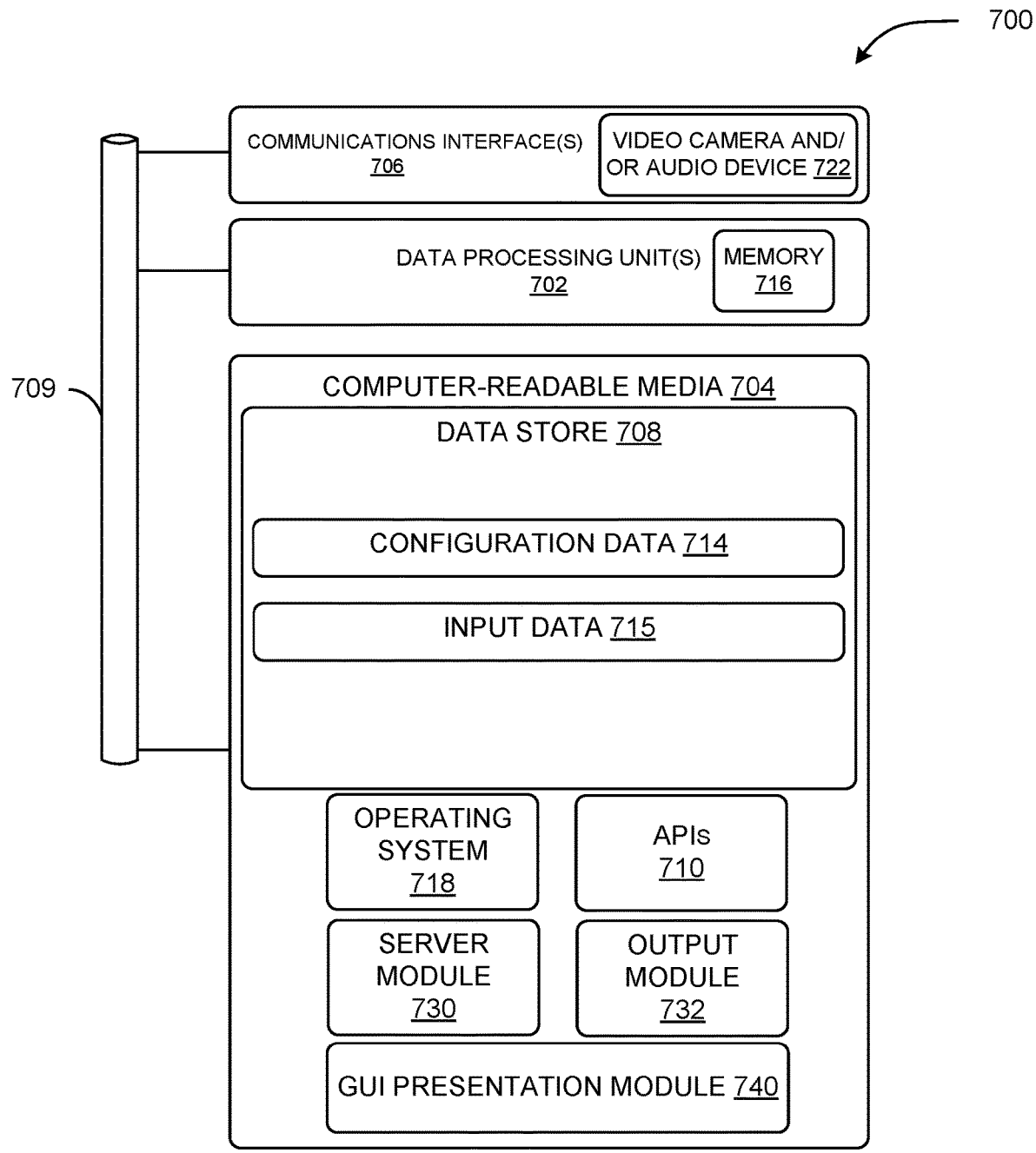
FIG. 13 is a computer architecture diagram illustrating a computing device architecture for a computing device capable of implementing aspects of the techniques and technologies presented herein.

FIG. 13 illustrates a diagram that shows example components of an example device 700 (also referred to herein as a "computing device") configured to generate data for some of the user interfaces disclosed herein. The device 700 may generate data that may include one or more sections that may render or comprise video, images, virtual objects, and/or content for display on the display screen 629. The device 700 may represent one of the device(s) described herein. Additionally, or alternatively, the device 700 may represent one of the client computing devices 606.

As illustrated, the device 700 includes one or more data processing unit(s) 702, computer-readable media 704, and communication interface(s) 706. The components of the device 700 are operatively connected, for example, via a bus 709, which may include one or more of a system bus, a data bus, an address bus, a PCI bus, a Mini-PCI bus, and any variety of local, peripheral, and/or independent buses.

As utilized herein, data processing unit(s), such as the data processing unit(s) 702 and/or data processing unit(s) 692, may represent, for example, a CPU-type data processing unit, a GPU-type data processing unit, a field-programmable gate array ("FPGA"), another class of DSP, or other hardware logic components that may, in some instances, be driven by a CPU. For example, and without limitation, illustrative types of hardware logic components that may be utilized include Application-Specific Integrated Circuits ("ASICs"), Application-Specific Standard Products ("ASSPs"), System-on-a-Chip Systems ("SOCs"), Complex Programmable Logic Devices ("CPLDs"), etc.

As utilized herein, computer-readable media, such as computer-readable media 704 and computer-readable media 694, may store instructions executable by the data processing unit(s). The computer-readable media may also store instructions executable by external data processing units such as by an external CPU, an external GPU, and/or executable by an external accelerator, such as an FPGA type accelerator, a DSP type accelerator, or any other internal or external accelerator. In various examples, at least one CPU, GPU, and/or accelerator is incorporated in a computing device, while in some examples one or more of a CPU, GPU, and/or accelerator is external to a computing device.

Computer-readable media, which might also be referred to herein as a computer-readable medium, may include computer storage media and/or communication media. Computer storage media may include one or more of volatile memory, nonvolatile memory, and/or other persistent and/or auxiliary computer storage media, removable and non-removable computer storage media implemented in any method or technology for storage of information such as computer-readable instructions, data structures, program modules, or other data. Thus, computer storage media includes tangible and/or physical forms of media included in a device and/or hardware component that is part of a device or external to a device, including but not limited to random access memory ("RAM"), static random-access memory ("SRAM"), dynamic random-access memory ("DRAM"), phase change memory ("PCM"), read-only memory ("ROM"), erasable programmable read-only memory ("EPROM"), electrically erasable programmable read-only memory ("EEPROM"), flash memory, compact disc read-only memory ("CD-ROM"), digital versatile disks ("DVDs"), optical cards or other optical storage media, magnetic cassettes, magnetic tape, magnetic disk storage, magnetic cards or other magnetic storage devices or media, solid-state memory devices, storage arrays, network attached storage, storage area networks, hosted computer storage or any other storage memory, storage device, and/or storage medium that can be used to store and maintain information for access by a computing device. The computer storage media can also be referred to herein as computer-readable storage media, non-transitory computer-readable storage media, non-transitory computer-readable medium, or computer storage medium.

In contrast to computer storage media, communication media may embody computer-readable instructions, data structures, program modules, or other data in a modulated data signal, such as a carrier wave, or other transmission mechanism. As defined herein, computer storage media does not include communication media. That is, computer storage media does not include communications media consisting solely of a modulated data signal, a carrier wave, or a propagated signal, per se.

Communication interface(s) 706 may represent, for example, network interface controllers ("NICs") or other types of transceiver devices to send and receive communications over a network. Furthermore, the communication interface(s) 706 may include one or more video cameras and/or audio devices 722 to enable generation of video feeds and/or still images, and so forth.

In the illustrated example, computer-readable media 704 includes a data store 708. In some examples, the data store 708 includes data storage such as a database, data warehouse, or other type of structured or unstructured data storage. In some examples, the data store 708 includes a corpus and/or a relational database with one or more tables, indices, stored procedures, and so forth to enable data access including one or more of hypertext markup language ("HTML") tables, resource description framework ("RDF") tables, web ontology language ("OWL") tables, and/or extensible markup language ("XML") tables, for example.

The data store 708 may store data for the operations of processes, applications, components, and/or modules stored in computer-readable media 704 and/or executed by data processing unit(s) 702 and/or accelerator(s). For instance, in some examples, the data store 708 may store session data (e.g., session data 636 as shown in FIG. 12), profile data (e.g., associated with a participant profile), and/or other data. The session data can include a total number of participants (e.g., users and/or client computing devices) in a communication session, activity that occurs in the communication session, a list of invitees to the communication session, and/or other data related to when and how the communication session is conducted or hosted.

The data store 708 may also include permission data 714, to control access and execution rights of each user. The permission data 714 can include identifiers for each user specific mission attributes for allowing users to execute recording functions of a communication program, attributes for allowing users to execute screen shot functions of a communication program, attributes for allowing users to execute meeting invitation functions of a communication program, etc. In addition, the data store 708 can also include input data 715 that can be received by individual computing devices. The input data can include voice data, text data, image data, video data, etc.

Alternately, some or all of the above-referenced data can be stored on separate memories 716 on board one or more data processing unit(s) 702 such as a memory on board a CPU-type processor, a GPU-type processor, an FPGA-type accelerator, a DSP-type accelerator, and/or another accelerator. In this example, the computer-readable media 704 also includes an operating system 718 and application programming interface(s) 710 (APIs) configured to expose the functionality and the data of the device 700 to other devices. Additionally, the computer-readable media 704 includes one or more modules such as the server module 730, the output module 732, and the GUI presentation module 740, although the number of illustrated modules is just an example, and the number may vary. That is, functionality described herein in association with the illustrated modules may be performed by a fewer number of modules or a larger number of modules on one device or spread across multiple devices.

In closing, although the various configurations have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

We claim:

1. A computer-implemented method for composing a presentation video from an input video stream depicting a person and a content video stream of shared content, the computer-implemented method configured for execution on a computing system comprising:
 obtaining, by the computing system, the content video stream of the shared content;
 analyzing, by the computing system, the input video stream to select a real-world object meeting one or more criteria with respect to at least one of a size, a shape, or a position of the real-world object from a plurality of real-world objects depicted in the input video stream, wherein the selection of the real-world object causes a selection of the person as a presenter;
 analyzing, by the computing system, the input video stream to select the person depicted in the input video stream as the presenter, wherein the selection of the person is in response to determining that the person meets criteria with respect to a predetermined distance or a predetermined position to the selected real-world object;
 dynamically selecting the person as the presenter in response to determining that the person meets criteria with respect to the predetermined distance or the predetermined position to the real-world object, wherein the person is not selected as the presenter when the person no longer meets criteria with respect to the predetermined distance or the predetermined position to the real-world object;
 generating the presentation video comprising the rendering of shared content and a filtered rendering of the person that is selected as the presenter in response to determining that the person meets the criteria with respect to the predetermined distance or the predetermined position to the selected real-world object, wherein the real-world object is selected in response to the selected real-world object meeting one or more criteria with respect to at least one of the size, the shape, or the position of the real-world object;
 causing a display of the presentation video on a plurality of computing devices associated with a plurality of participants of a communication session, wherein the presentation video comprises the rendering of shared content and the filtered rendering of the person that is selected as the presenter in response to detecting that the real-world object meets the one or more criteria with respect to at least one of the size, the shape, or the position of the real-world object and determining that the person is at the predetermined distance or the predetermined position relative to the real-world object;
 detecting a presence of an additional speaker of the communication session, wherein the additional speaker is detected based on an activity level of the additional speaker, the activity level being based on at least one of a threshold volume level generated by an audio stream generated by a computing device of the additional speaker, a frequency or quantity of words spoken by the additional speaker, a video stream received from a selected camera, or a position of the additional speaker relative to the real-world object, wherein the additional speaker is different than the person that is selected as the presenter; and
 modifying the presentation video to add a rendering of the additional speaker in response to determining that the activity level of the additional speaker exceeds an activity threshold, wherein the modification of the presentation video causes a display of the rendering of the additional speaker concurrently with the rendering of shared content and the filtered rendering of the person that is selected as the presenter in response to determining association between the real-world object and the person, wherein the association can be based on a number or frequency of interactions with the real-world object.

2. The computer-implemented method of claim 1, further comprising: receiving configuration data identifying a camera for generating the input video, wherein the configuration data indicates a position or direction of the camera that is directed to a predetermined area, wherein the one or more predetermined physical characteristics of the person is detected in response to determining that the camera has captured a threshold number of images of the person within a viewing area of the camera.

3. The computer-implemented method of claim 1, further comprising: receiving audio data from one or more microphones indicating a position of the person, wherein the audio data contains audio signals that are coordinated with the input video stream, wherein the one or more predetermined physical characteristics of the person is detected in response to determining that the audio data indicates that the person is at a predetermined position.

4. The computer-implemented method of claim 1, further comprising:
 receiving one or more metadata files including organizational information pertaining to individual participants of the communication session, the one or more metadata files associating the individual participants with property data defining facial features of the each of the individual participants, wherein the analysis of the input video stream includes identifying the person using facial recognition analysis by comparing the facial features of the one or more metadata files and the input video stream depicting the person, wherein the one or more predetermined physical characteristics of the person is detected in response to determining that the facial features of the metadata and the input video stream depicting the person reach a matching threshold; and
 causing a display of the organizational information concurrently with the rendering of shared content and the filtered rendering of the person in response to determining that the one or more predetermined physical characteristics of the person is detected.

5. The computer-implemented method of claim 1, further comprising: causing a selection of a real-world object depicted in the input video stream, the real-world object is selected in response to determining that one or more physical properties of the real-world object meets one or more criteria, wherein the one or more physical properties of the real-world object meets one or more criteria when a position of the real-world object is within a predetermined area, wherein the one or more predetermined physical characteristics of the person is detected in response to determining an association between the real-world object and the person.

6. The computer-implemented method of claim 1, further comprising: causing a selection of the real-world object depicted in the input video stream, the real-world object is selected in response to determining that one or more physical properties of the real-world object meets one or more criteria, wherein the one or more physical properties of the real-world object meets one or more criteria when at least one of the size of the real-world object is exceeds a size threshold, when the position of the real-world object is within a predetermined area, or when the shape of the real-world object has a threshold match with a predetermined shape, wherein the one or more predetermined physical characteristics of the person is detected in response to determining an association between the real-world object and the person.

7. The computer-implemented method of claim 1, further comprising: causing a selection of a real-world object depicted in the input video stream, the real-world object is selected in response to determining that one or more physical properties of the real-world object meets one or more criteria, wherein determining that one or more physical properties of the real-world object meets one or more criteria comprises:
    displaying a rendering of the real-world object; and
    receiving a user input indicating a selection of the real-world object based on the display of the rendering of the physical properties of the real-world object.

8. The computer-implemented method of claim 1, causing a selection of a real-world object depicted in the input video stream, the real-world object is selected in response to determining that one or more physical properties of the real-world object meets one or more criteria, wherein the one or more predetermined physical characteristics of the person is detected in response to determining an association between the real-world object and the person, wherein the association is determined when an analysis of the input video stream indicates that the person is at a predetermined position relative to the real-world object.

9. The computer-implemented method of claim 1, causing a selection of a real-world object depicted in the input video stream, the real-world object is selected in response to determining that one or more physical properties of the real-world object meets one or more criteria, wherein the one or more predetermined physical characteristics of the person is detected in response to determining an association between the real-world object and the person, wherein the association is determined when an analysis of the input video stream indicates that a distance between the real-world object and the person is less than a threshold distance.

10. The computer-implemented method of claim 1, further comprising:
    receiving the input video stream from a camera directed toward the person, wherein the input video stream comprises an image of the person and an image of a physical background that is positioned behind the person relative to the camera;
    applying a processing filter to the input video stream to remove the image of the physical background from the input video stream, the processing filter generating a filtered video stream of the person comprising a rendering of the person without the image of the physical background, wherein the filtered video stream of the person is shaped according to an outline of the person; and
    scaling the filtered video stream of the person to a size for compatibility with the rendering of shared content; and
    inserting the filtered video stream of the person that is shaped according to the outline of the person in the presentation video, wherein the filtered video stream is positioned as an overlay over the shared content.

11. The method of claim 1, wherein the selection of the person as the presenter modifies a role of the person and one or more audio permissions for communicating audio streams with the other participants of the communication session.

12. The computer-implemented method of claim 1, wherein modifying the presentation video to add the rendering of the additional speaker is in response to determining that the activity level of the additional speaker exceeds an activity threshold and in response to determining that the additional speaker meets criteria with respect to the predetermined distance or the predetermined position to the real-world object, wherein the additional speaker is not selected as the presenter when the additional speaker no longer meets criteria with respect to the predetermined distance or the predetermined position to the real-world object.

13. A computing device for composing a presentation video from an input video stream depicting a person and a rendering of shared content, the computing device comprising:
    one or more processing units; and
    a computer-readable storage medium having encoded thereon computer-executable instructions to cause the one or more processing units to perform a method comprising:
    analyzing, by the computing device, the input video stream to select a real-world object depicted in the input video stream, the real-world object is selected in response to determining that one or more physical properties of the real-world object meets one or more criteria with respect to at least one of a size, a shape, or a position of the real-world object from a plurality of real-world objects depicted in the input video stream, wherein the selection of the real-world object causes a selection of the person as a presenter;
    analyzing, by the computing device, the input video stream to select the person depicted in the input video stream as the presenter, wherein the selection of the person is in response to determining that the person meets criteria with respect to a predetermined distance or a predetermined position to the selected real-world object;
    dynamically selecting the person as the presenter in response to determining that the person meets criteria with respect to the predetermined distance or the predetermined position to the real-world object, wherein the person is not selected as the presenter when the person no longer meets criteria with respect to the predetermined distance or the predetermined position to the real-world object;
    generating the presentation video comprising the rendering of shared content and a rendering of the person that is selected as the presenter in response to determining that the person meets the criteria with respect to the predetermined distance or the predetermined position to the real-world object, wherein the real-world object is selected in response to the selected real-world object meeting one or more criteria with respect to at least one of the size, the shape, or the position of the real-world object;

causing a display of the presentation video on a plurality of computing devices associated with a plurality of participants of a communication session, wherein the presentation video comprises the rendering of shared content and the rendering of the person that is selected as the presenter in response to determining that the real-world object meets the one or more criteria with respect to at least one of the size, the shape, or the position of the real-world object and determining that the person is at the predetermined distance or the predetermined position relative to the real-world object;

detecting a presence of an additional speaker of the communication session, wherein the additional speaker is detected based on an activity level of the additional speaker, the activity level being based on at least one of a threshold volume level generated by an audio stream generated by a computing device of the additional speaker, a frequency or quantity of words spoken by the additional speaker, a video stream received from a selected camera, or a position of the additional speaker relative to the real-world object, wherein the additional speaker is different than the person that is selected as the presenter; and modifying the presentation video to add a rendering of the additional speaker in response to determining that the activity level of the additional speaker exceeds an activity threshold, wherein the modification of the presentation video causes a display of the rendering of the additional speaker concurrently with the rendering of shared content and the filtered rendering of the person that is selected as the presenter in response to determining association between the real-world object and the person, wherein the association can be based on a number or frequency of interactions with the real-world object.

14. The computing device of claim 13, wherein the selection of a real-world object is based on a process of monitoring the input video stream to determine when the one or more physical properties of the real-world object meets the one or more criteria, wherein the one or more physical properties of the real-world object meets one or more criteria when a position of the real-world object is within a predetermined area.

15. The computing device of claim 13, wherein modifying the presentation video to add the rendering of the additional speaker is in response to determining that the activity level of the additional speaker exceeds an activity threshold and in response to determining that the additional speaker meets criteria with respect to the predetermined distance or the predetermined position to the real-world object, wherein the additional speaker is not selected as the presenter when the additional speaker no longer meets criteria with respect to the predetermined distance or the predetermined position to the real-world object.

16. A computer-readable storage device having encoded thereon computer-executable instructions to cause the one or more processing units of a computing device to perform a method comprising:

analyzing, by the computing device, the input video stream to select a real-world object depicted in the input video stream, the real-world object is selected in response to determining that one or more physical properties of the real-world object meets one or more criteria with respect to at least one of a size, a shape, or a position of the real-world object from a plurality of real-world objects depicted in the input video stream, wherein the selection of the real-world object causes a selection of the person as a presenter;

analyzing, by the computing device, the input video stream to select the person depicted in the input video stream as the presenter, wherein the selection of the person is in response to determining that the person meets criteria with respect to a predetermined distance or a predetermined position to the selected real-world object;

dynamically selecting the person as the presenter in response to determining that the person meets criteria with respect to the predetermined distance or the predetermined position to the real-world object, wherein the person is not selected as the presenter when the person no longer meets criteria with respect to the predetermined distance or the predetermined position to the real-world object;

generating the presentation video comprising the rendering of shared content and a rendering of the person that is selected as the presenter in response to determining that the person meets the criteria with respect to the predetermined distance or the predetermined position to the real-world object, wherein the real-world object is selected in response to the selected real-world object meeting one or more criteria with respect to at least one of the size, the shape, or the position of the real-world object; and causing a display of the presentation video on a plurality of computing devices associated with a plurality of participants of a communication session, wherein the presentation video comprises the rendering of shared content and the rendering of the person that is selected as the presenter in response to determining that the real-world object meets the one or more criteria with respect to at least one of the size, the shape, or the position of the real-world object and determining that the person is at the predetermined distance or the predetermined position relative to the real-world object;

detecting a presence of an additional speaker of the communication session, wherein the additional speaker is detected based on an activity level of the additional speaker, the activity level being based on at least one of a threshold volume level generated by an audio stream generated by a computing device of the additional speaker, a frequency or quantity of words spoken by the additional speaker, a video stream received from a selected camera, or a position of the additional speaker relative to the real-world object, wherein the additional speaker is different than the person that is selected as the presenter; and modifying the presentation video to add a rendering of the additional speaker in response to determining that the activity level of the additional speaker exceeds an activity threshold, wherein the modification of the presentation video causes a display of the rendering of the additional speaker concurrently with the rendering of shared content and the filtered rendering of the person that is selected as the presenter in response to determining association between the real-world object and the person, wherein the association can be based on a number or frequency of interactions with the real-world object.

17. The computer-readable storage device of claim 16, wherein the rendering of shared content is displayed on a screen positioned in an environment associated with the person, wherein the rendering of shared content is captured, at least in part, by a camera generating the input video stream depicting the presenter, wherein the association between the real-world object and the person is determined in response to detecting that the person, the shared content, and the real-world object are concurrently depicted in the input video stream.

18. The computer-readable storage device of claim 16, wherein the selection of a real-world object is based on a process of monitoring the input video stream to determine when the one or more physical properties of the real-world object meets the one or more criteria, wherein the one or more physical properties of the real-world object meets one or more criteria when a position of the real-world object is within a predetermined area.

19. The computer-readable storage device of claim 16, wherein the selection of a real-world object is based on a process of monitoring the input video stream to determine when the one or more physical properties of the real-world object meets the one or more criteria, wherein the one or more physical properties of the real-world object meets one or more criteria when at least one of the size of the real-world object is exceeds a size threshold, when the position of the real-world object is within a predetermined area, or when the shape of the real-world object has a threshold match with a predetermined shape.

20. The computer-readable storage device of claim 16, wherein modifying the presentation video to add the rendering of the additional speaker is in response to determining that the activity level of the additional speaker exceeds an activity threshold and in response to determining that the additional speaker meets criteria with respect to the predetermined distance or the predetermined position to the real-world object, wherein the additional speaker is not selected as the presenter when the additional speaker no longer meets criteria with respect to the predetermined distance or the predetermined position to the real-world object.

* * * * *